(12) United States Patent
Hagano et al.

(10) Patent No.: US 6,745,914 B2
(45) Date of Patent: Jun. 8, 2004

(54) CAP DEVICE

(75) Inventors: Hiroyuki Hagano, Aichi-ken (JP); Masayuki Nakagawa, Aichi-ken (JP)

(73) Assignee: Toyoda Gosei., Ltd., Aichi-ken (JP)

( * ) Notice: Subject to any disclaimer, the term of this patent is extended or adjusted under 35 U.S.C. 154(b) by 17 days.

(21) Appl. No.: 10/302,988

(22) Filed: Nov. 25, 2002

(65) Prior Publication Data

US 2003/0098307 A1 May 29, 2003

(30) Foreign Application Priority Data

Nov. 26, 2001 (JP) ........................................ 2001-359110
Jul. 22, 2002 (JP) ........................................ 2002-212785

(51) Int. Cl.[7] ............................ B65D 41/04; B65D 51/16
(52) U.S. Cl. .................... 220/288; 220/303; 220/304; 220/212.5; 220/203.24; 220/203.28; 220/DIG. 33
(58) Field of Search ................... 220/203.24, 203.28, 220/212.5, 288, 303, 304

(56) References Cited

U.S. PATENT DOCUMENTS

| | | | | |
|---|---|---|---|---|
| 2,772,809 A | * | 12/1956 | Orrin | 220/318 |
| 4,007,849 A | * | 2/1977 | Hinkle | 215/213 |
| 4,294,376 A | * | 10/1981 | Keller | 220/318 |
| 4,830,058 A | | 5/1989 | Harris | |
| 5,183,173 A | * | 2/1993 | Heckman | 220/203.07 |
| 5,385,256 A | | 1/1995 | Brown | |
| 5,845,800 A | * | 12/1998 | Shaw et al. | 220/210 |
| 6,202,879 B1 | * | 3/2001 | Gericke | 220/255 |
| 6,209,745 B1 | * | 4/2001 | Jansson | 220/288 |
| 6,237,797 B1 | * | 5/2001 | Hurford | 220/212.5 |
| 6,648,160 B2 | * | 11/2003 | Hotch | 220/255 |

FOREIGN PATENT DOCUMENTS

| | | |
|---|---|---|
| FR | 2 437 992 A | 4/1980 |
| GB | 1 205 582 A | 9/1970 |

* cited by examiner

Primary Examiner—Lee Young
Assistant Examiner—James Smalley
(74) Attorney, Agent, or Firm—Posz & Bethards, PLC

(57) ABSTRACT

A fuel cap 10 maintains high sealing even when subjected to external force; is easy to operate; and requires minimal space for accommodation. The cap device comprises a casing body 20 for closing the filler opening FNb in a sealed condition, a cover 40, a handle 45, a clutch mechanism 60 and a torque transmission mechanism 80. By upraising the handle to the handling position and applying rotational torque, rotational torque is transmitted to the casing body 20 via the clutch mechanism 60 and the torque transmission mechanism 80, closing the filler opening FNb. The handle 45 lowers back to the retracted position when released, whereupon the clutch mechanism 60 assumes non-transmission mode wherein the cover 40 and the handle 45 rotate freely if subjected to external force such as in a collision.

20 Claims, 37 Drawing Sheets

CAP DEVICE

This application claims the benefit of and priority from Japanese Applications No. 2001-359110 filed Nov. 26, 2001 and No. 2002-212785 filed Jul. 22, 2002, the contents of which are incorporated herein by reference.

BACKGROUND OF THE INVENTION

1. Field of the Invention

The present invention relates to a cap device for detachable attachment to a opening member of a fuel tank.

2. Description of the Related Art

One example of a conventional tank cap devices is disclosed in U.S. Pat. No. 4,830,058. The fuel cap comprises an outer shell having a gasket attached for providing closure to the opening of a filler neck; a cover having a handle and mounted on the outer shell; and an interconnecting mechanism between the outer shell and cover for switching between a transmission mode, in which rotational torque of the cover is transmitted, and a non-transmission mode in which same is not transmitted. The interconnecting mechanism is provided with an actuating button exposed at the top face of the handle; by pressing the actuating button one may switch between transmission mode and non-transmission mode to open/close the opening with the fuel cap. With the gas cap closed, the cover and handle freely rotate with respect to the outer shell so that if subjected to an external force the cover and handle will simply spin without turning the outer shell, thereby preventing loss of seal by the gasket.

However, the cap has the drawback that when attaching or detaching the fuel gap, it is difficult to discern how it should be operated, i.e., that pressing the actuating button allows the cap to be attached or detached, and is thus not easy to use. Because the actuating button is located on the handle, the handle needs to be larger, which has the drawback of requiring a larger space to accommodate it around the opening of the tank.

SUMMARY OF THE INVENTION

An object of the present invention is to provide a cap device that maintains a tight seal when subjected to external force, while at the same time providing ease of operation and taking up minimal space.

In accordance with one embodiment of the present invention, a cap device comprising a cap configured to open and close a tank opening. The cap comprises a closer for closing the tank opening with air-tight sealing at a closing position; a handle mechanism having a handle, the handle being switchable between a handling position and a retracted position, the handling position being a position for opening and closing the closer, the retracted position being a position in which the tank opening is closed, and the handle in the handling position being configured to project outwardly from an upper portion of the closer a greater distance than in the retracted position; andan interconnecting mechanism provided between the handle mechanism and the closer, for transmitting to the closer rotational torque in a closing direction and opening direction when the rotational torque is applied to the handle mechanism. The interconnecting mechanism comprises a clutch mechanism having a clutch member, the clutch member setting transmission mode wherein the rotational torque in the closing direction and the opening direction is transmitted from the handle to the closer when the handle is placed in the handling position; and the clutch member setting non-transmission mode wherein the rotational torque in the opening direction is not transmitted from the handle to the closer and the handle mechanism rotates freely in the opening direction when the handle is placed in the retracted position.

The cap device pertaining to the invention is designed such that when the handle of a handle mechanism is turned, rotational torque of the handle is transmitted to a casing main body via a clutch mechanism and torque transmission mechanism of an interconnecting mechanism, so that the tank opening is provided closure by means of the casing main body in such a way that rotational torque in the closing direction does not exceed a predetermined level. With the handle in the handling position, the casing main body disengages from the opening through application of rotational torque in the opening direction. By placing the handle in the handling position, rotational torque is readily transmitted to the handle, providing ease of attachment and detachment.

With the handle in the retracted position, on the other hand, the clutch mechanism is disabled from transmitting rotational torque in the opening direction, and if rotational torque should be applied to the handle in this state it will simply turn freely with respect to the casing main body. Thus if the handle should be subjected to external force the opening direction during a collision or the like, it will simply turn freely so that no rotational torque is transmitted to the casing main body via the interconnecting mechanism, thus avoiding loss of seal.

With the cap closed, the handle turns freely in the opening direction allowing the user to turn the handle to a desired position, thereby improving the ease of attachment and detachment.

In a preferred embodiment the clutch mechanism comprises a first clutch unit for transmitting rotational torque in the closing direction in both the handling position and retracted position; and a second clutch unit for transmitting rotational torque in the opening direction when the handle is in the handling position.

Since the first clutch unit transmits rotational torque regardless of the position of the handle, i.e. even with the handle not in the handling position, the tank opening can be closed by the casing main body even if the user has neglected to move the handle to the handling position. With the handle in the retracted position, the first clutch unit and second clutch unit turn freely in the opening direction, preventing the casing main body from turning under external force and resultant loss of seal.

In a preferred embodiment the handle mechanism comprises a cover covering the interconnecting mechanism; and an axial support mechanism for axially supporting the handle so as to allow operation thereof between the handling position and retracted position relative to the cover. Where the axial support mechanism comprises an urging mechanism for urging the handle towards the retracted position, the need for the user to return the handle to the retracted position is obviated, providing exceptional ease of use and preventing the handle from chattering or emitting noise when subjected to vibration.

In a preferred embodiment the urging mechanism comprises a cam having a cam face; and a resilient cam support piece for producing urging force towards the retracted position by means of following the cam face as the handle is rotated. This arrangement obviates the need for a separate coil spring or the like, so that fewer parts are required.

In a preferred embodiment the clutch mechanism comprises a clutch urging mechanism comprising a cam face formed on the handle and a clutch spring that urges against the clutch member. The clutch urging mechanism is designed such that by moving the handle from the retracted position to the handling position the clutch member is pushed via the cam face and switched to transmission mode; and by moving the handle from the handling position to the retracted position the clutch member is switched to non-transmission mode under the urging by the clutch spring. With this arrangement, the arrangement for switching the handle can be optimized.

The clutch spring may be provided as a resin spring integrally formed with the clutch member or torque member, thereby obviating the need for a separate coil spring or the like, so that fewer parts are required.

The urging mechanism may be designed so that urging force of the handle moving from the handling position to the retracted position reaches a greater level at an angle in proximity to the retracted position; and the clutch spring may be designed so that urging force of the handle moving from the handling position to the retracted position reaches its a greater level at an angle in proximity to the handling position. With this arrangement, the angle of moving the handle is distributed to two resin springs so that resin springs are not subjected large deformation, thereby avoiding damage or change in spring force due to deterioration over a period of years. Where the cap device is deployed in a vehicle subjected to vibration, the handle, being urged by means of the urging mechanism, does not produce noise due to vibration.

The clutch spring may be placed so as urge the torque member while positioned with respect to the casing main body. With this arrangement the torque member is supported while being urged against the casing main body, thereby preventing vibration noise due to vibration transmitted to the tank, as well as providing stable transmission of rotational torque.

The clutch spring may comprise an arm formed as a cantilever piece arranged coplanar with the torque member or clutch member and supported at one thereof; and a pushing protrusion that extends from the distal end of the arm, so that urging force is created through pushing by the pushing protrusion. With this arrangement, urging force can be adjusted in a simple manner simply by setting the pushing protrusion to the proper height.

In yet another preferred embodiment herein, the casing main body comprises a casing body for sealing the tank opening and having a casing interlocking portion for interlocking with a opening interlocking portion by means of turning by a predetermined angle.

According to the cap device pertaining to the invention, when the actuating portion of actuating means is rotated rotational torque of the actuating portion is transmitted to the casing main body via the interconnecting mechanism, causing the casing main body to mate with the tank opening member into the closed position in order to close the tank opening.

With the actuating portion in the handling position, the resultant interconnected state enables rotational torque to be transmitted, whereby application of rotational torque in this state causes the casing main body to close the tank opening. Once the casing main body closes the tank opening the actuating portion assumes the retracted position. In storage transmission rotational torque is not transmitted so that the actuating portion turns freely with respect to the casing main body. Accordingly if the actuating portion should be subjected to external force e.g. in a collision, it will turn freely without transmitting rotational torque to the casing main body via the interconnecting mechanism, preventing loss of seal.

With the cap closed, the actuating portion turns freely, allowing the user to turn the actuating portion to a desired position, thereby improving the ease of attachment and detachment.

In a preferred embodiment the actuating portion will consist of a handle supported on the casing main body so as to be rotatable about a support axis, and switched between a handling position and a retracted position by being upraised or lowered.

In yet another preferred embodiment of the invention the casing main body comprises a casing body for sealing the tank opening and having a casing interlocking portion for interlocking with the opening interlocking portion through rotation by a predetermined angle; and a cover rotatably mounted on the casing body and having the handle rotatably supported thereon.

In a preferred embodiment the interconnecting mechanism comprises a torque plate rotating in unison with a cover and having a torque piece interlocking portion; and a casing interlocking portion formed on the casing body and having a body interlocking portion switchable between interconnected mode and non-interconnected mode by interlocking or non-interlocking with the torque piece interlocking portion, the torque piece interlocking portion and body interlocking portion are designed to disengage at rotational torque above a predetermined level through rotation in the closing direction, and to rotate in unison with the casing body through rotation in the opening direction, and the handle comprises a cam that in association with movement between handling position and retracted position moves the torque plate to switch it between interconnected mode and non-interconnected mode.

The actuating means may comprise a spring for urging the handle so as to move it to the retracted position when released from the handling position. This enables the handle to move reliable to the retracted position. In a preferred embodiment the spring is formed as a cantilever piece extending integrally from the torque plate, with one end of the cantilever piece urging the casing body by pushing against it, or formed as a cantilever piece extending integrally from upper portion of the casing body, with one end of the cantilever piece urging the torque plate by pushing against it. By integrally forming the spring with the torque plate or casing, the number of parts can be reduced.

DESCRIPTION OF THE PREFERRED EMBODIMENTS

A. First Embodiment (1) General Structure of Fuel Cap 10

Figure 1:
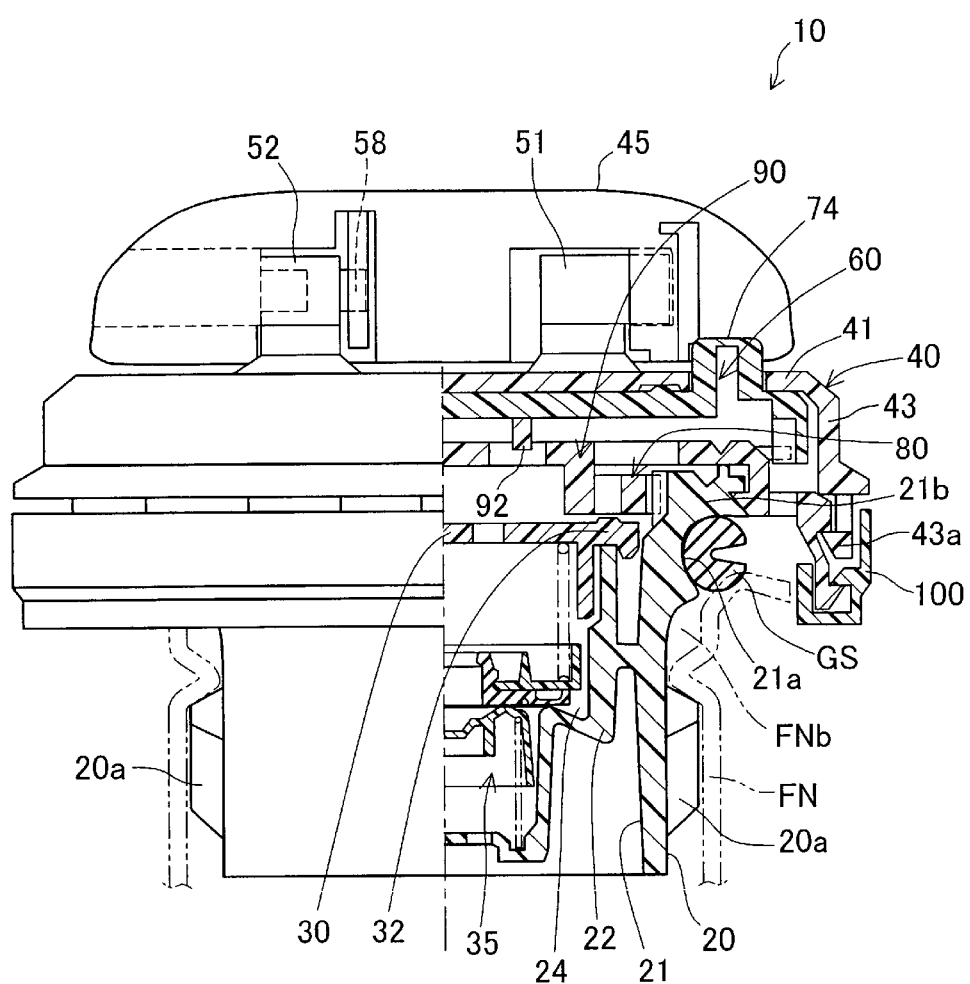
FIG. 1 is an illustrative diagram showing in partial cutaway a cap device comprising a fuel cap pertaining to a first embodiment of the invention.

FIG. 1 is an illustrative diagram showing in partial cutaway a cap device comprising a fuel cap 10 (cap) pertaining to a first embodiment of the invention. In FIG. 1, the fuel cap 10 is attached to a filler neck FN having a filler opening FNb (tank opening) for supplying fuel to a fuel tank, not shown. The cap 10 comprises a casing body 20 (closer) made of polyacetal or other synthetic resin material, an inner cover 30 closing the upper opening of the casing body 20, forming a valve chamber 24; a regulator valve 35 housed within the valve chamber 24; a cover 40 made of nylon or other synthetic resin and mounted on the upper portion of the casing body 20; a handle 45 mounted on the upper face of the cover 40; a clutch mechanism 60 and the torque transmission mechanism 80 (interconnecting mechanism); a tether mechanism 100; and a gasket GS installed on the outside rim of the upper portion of the casing body 20 to provide a seal between the casing body 20 and the filler neck FN.

Figure 2:
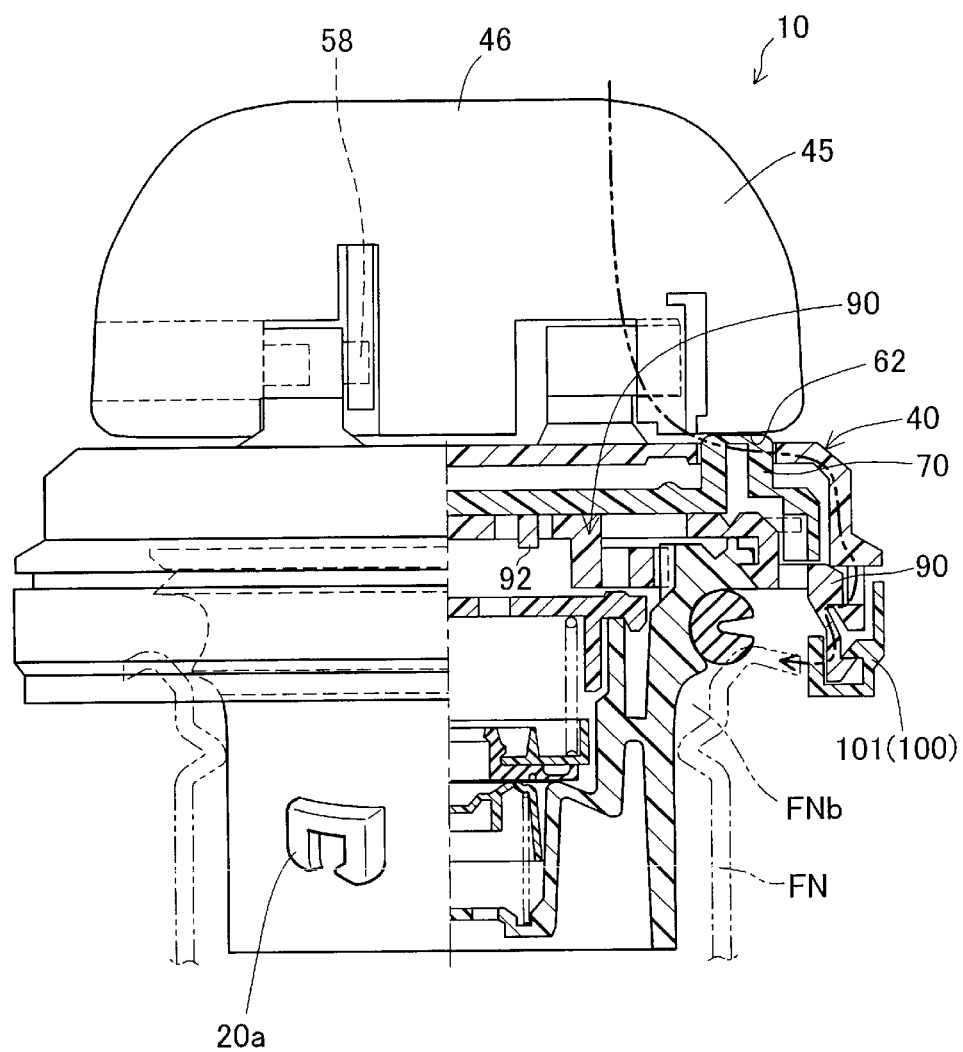
FIG. 2 is an illustrative diagram showing in partial cutaway a cap device rotatable by grasping the handle with the fingers and raising it up.

In the fuel cap 10 shown in FIG. 2, grasping the handle 45 and raising it upward while rotating allows the fuel cap 10 to be attached to or detached from the filler neck FN to close or open the filler opening FNb. External pressure in the opening direction applied to the cover 40 and the handle 45 in the upper portion of the fuel cap 10 will simply cause it to turn freely, so that the fuel cap 10 does not come away from the filler neck FN.

(2) Arrangement of Parts

The various parts of the fuel cap 10 pertaining to the present embodiment are described in detail hereinbelow.

(2)-1 The Casing Body 20

In FIG. 1, the casing body 20 comprises a substantially round outer tube 21 and a valve chamber molding 22 integrally provided to the interior of the outer tube 21. The valve chamber molding 22 houses a positive pressure valve and negative pressure valve that function as a regulator valve 35. The inner cover 30 is welded by an ultrasonic welding technique onto the upper portion of the valve chamber molding 22 to form the valve chamber 24.

The gasket GS is installed to the outside of the bottom edge of a flange 21b in the upper portion of the casing body 20. The gasket GS is interposed between a seal retaining portion 21a of the flange 21b and the filler opening FNb of the filler neck FN so as to be forced against the seating face of the filler neck FN when the fuel cap 10 is tightened in the filler opening FNb, providing a sealing action.

Figure 3:
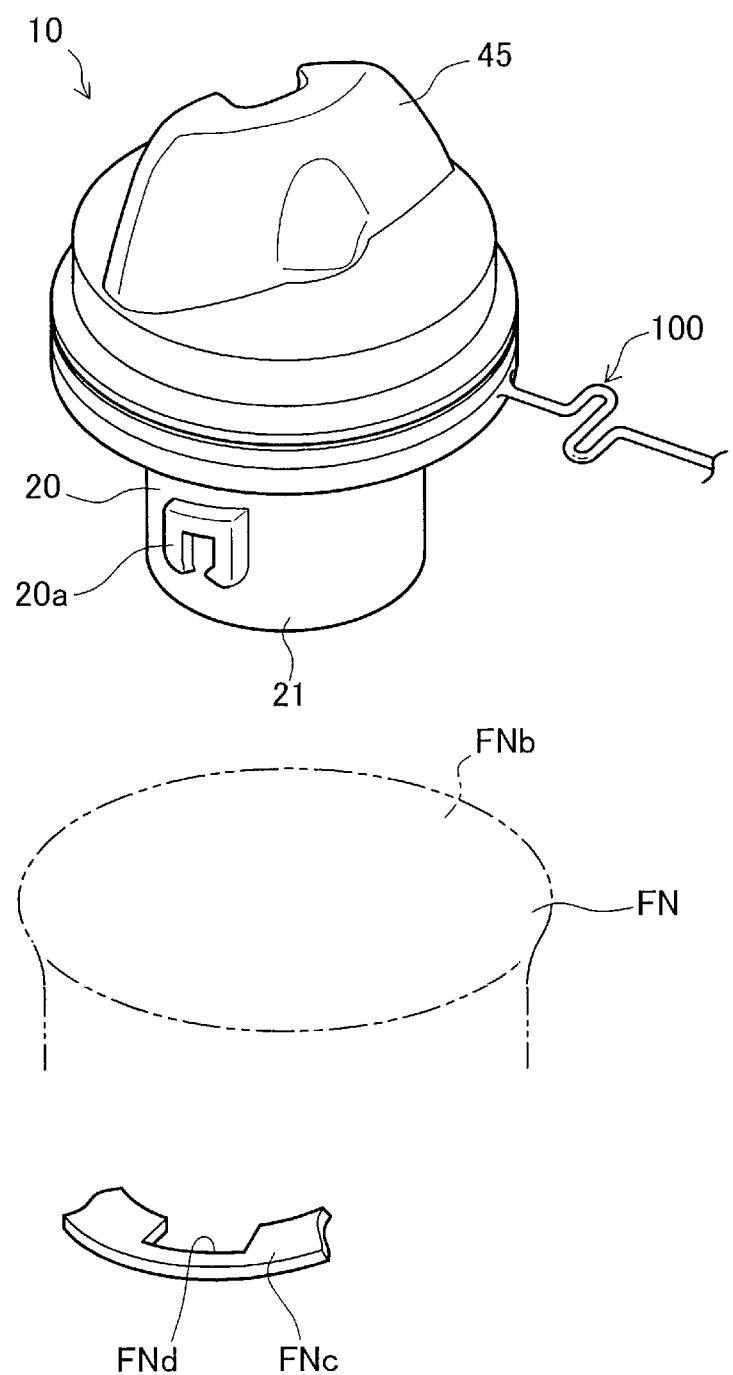
FIG. 3 is an illustrative diagram showing the relationship of the casing interlocking portion of the casing body to the filler neck.

FIG. 3 is an illustrative diagram showing the relationship of the casing interlocking portion 20a of the casing body 20 to the filler neck FN. The casing interlocking portion 20a is formed on the bottom outside wall of the outer tube 21. A opening interlocking portion FNc is formed on the inside wall of the filler neck FN. In a portion of the inside wall of the opening interlocking portion FNc is formed a neck insertion notch FNd into which the casing interlocking portion 20a is insertable in the axial direction. With the casing interlocking portion 20a aligned with the neck insertion notch FNd and the fuel cap 10 inserted into filler opening FNb of the filler neck FN, turning the fuel cap 10 by a predetermined angle (about 90°) causes the casing interlocking portion 20a to be engaged by the opening insertion notch FNc to attach the fuel cap 10 to the filler neck FN.

(2)-2 Inner Cover 20

As shown in FIG. 1, the inner cover 30 has a flange 32 formed on the outside wall of the inner cover 30, the bottom edge of the flange 32 being ultrasonically welded to the top of the valve chamber molding 22.

(2)-3 Structure of the Cover 40

The cover 40 comprises an upper wall 41 and a side wall 43 formed at the outside rim of the upper wall 41, integrally molded in a cup configuration. Support projections 43a extend from the lower interior of the side wall 43. The support projections 43a are arranged at six equidistant locations along the inside rim of the side wall 43. The support projections 43a mate with the outside rim of the torque member 90 of the torque transmission mechanism 80 to rotatably attach the cover 40 to the casing body 20 via the torque member 90. The cover 40 attachment structure is described in detail later.

Figure 4:
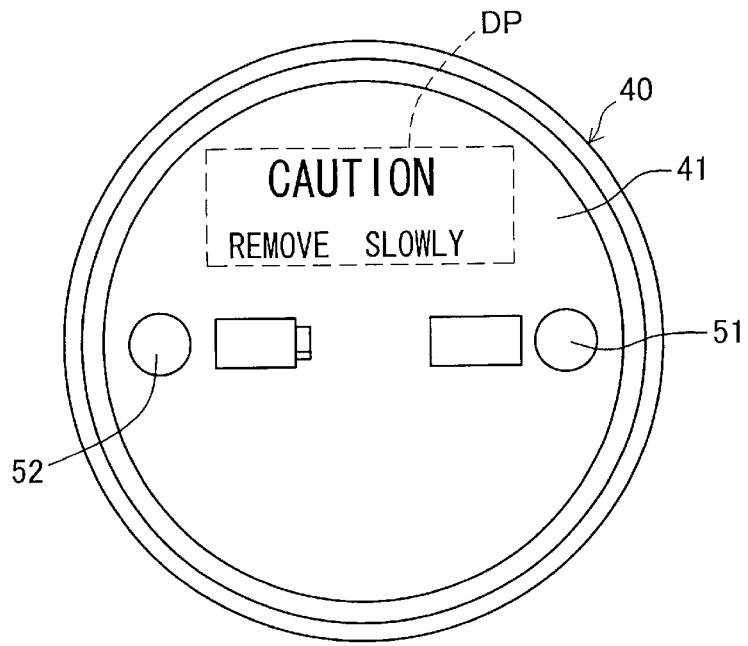
FIG. 4 is a plan view showing the cover.

FIG. 4 is a plan view showing the cover 40. The cover 40 is made of polyamide (PA), polyethylene (PP), acrylonitrile-butadiene-styrene (ABS) or polycarbonate (PC). The cover 40 is made of conductive resin material so as to constitute part of a ground path, indicated by the double-dotted lines in FIG. 2. The conductive resin material may be imparted with electrical conductivity by adding a metal filler (e.g. stainless steel, nickel, chromium, zinc, copper, aluminum, gold, silver, magnesium or titanium filler or some combination thereof) etc. Metal filler content is from 1 to 30 wt %. The reason is that amounts of less than 1 wt % do not give electrical conductivity, whereas in excess of 30 wt % the resin becomes highly viscous in injection molding process of the cover 40, possibly resulting in injection molding defects due to metal filler clogging or pooling.

An indicia portion DP is formed on the surface of the upper wall 43 of the cover 40. The indicia portion DP comprises of indicia such as text describing function, warning, description line, record or bar code, marked by laser irradiation. 0.01 to 3 wt % of carbon is added for the purpose of laser irradiation. Marking by laser irradiation is not possible with carbon content below 0.01 wt %, whereas in excess of 3 wt % the energy of the laser is absorbed by the cover 40 as a whole, so that localized coloration in the indicia portion DP is not possible.

(2)-4 Structure of Handle 45

Figure 5:
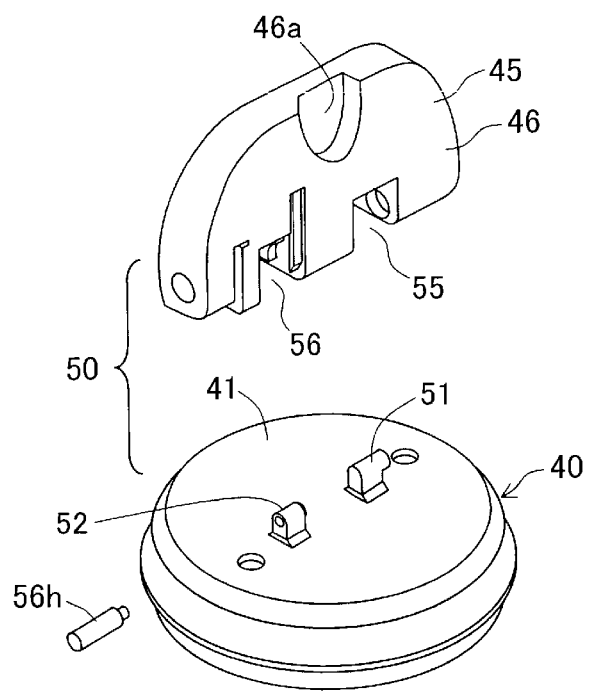
FIG. 5 is a perspective view showing parts on top of the fuel cap disassembled.

FIG. 5 is a perspective view showing parts on top of the fuel cap disassembled. The handle 45 comprises a rectangular handle body 46 with chamfered corners. The handle body 46 is of semicircular configuration having an actuating recess 46a produced by recessing its outside edge at the center. The actuating recess 46a serves as a recessed location for inserting a finger to provide ease of operation when the handle 45 has been lowered into the retracted position (see FIG. 1).

(2)-5 Axial Support Mechanism 50

The handle 45 is rotatably mounted on the upper wall 41 of the cover 40 by means of an axial support mechanism 50. The axial support mechanism 50 comprises axial support portions 51, 52 projecting from the upper wall 41 of the cover 40, and axially supported portions 55, 56 formed on the handle 45 and rotatably supported by the axial support portions 51, 52.

(2)-5-1 Axial Support Portions 51, 52

Figure 6:
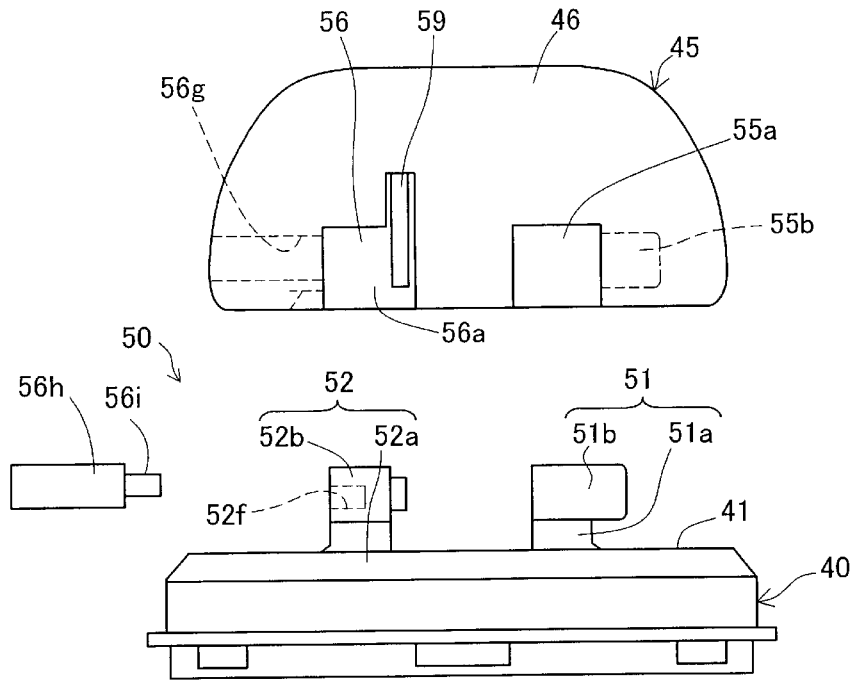
FIG. 6 is a front view showing the handle detached from the cover.

FIG. 6 is a front view showing the handle 45 detached from the cover 40. The axial support portions 51, 52 are members for rotatably supporting the handle 45 and are provided in a pair in the center of the cover 40. The axial support portion 51 comprises a leg portion 51a and an axle portion 51b projecting from the side of the leg portion 51a, and the handle 45 is rotatable about the axle portion 51b while supported thereby. The axial support portion 52 comprises a leg portion 52a and an axle portion 52b projecting from the top of the leg portion 52a. An axle hole 52f is formed in the side of the axle portion 52b.

(2)-5-2 Axially Supported Portions 55, 56

The axially supported portions 55, 56 are formed extending from the bottom to the center of the handle 45 and are provided so that the handle 45 may be supported via the axial support portions 51, 52 provided on the cover 40. The axially supported portion 55 comprises an opening 55a open at the bottom and at one side of the handle 45, and an axle hole 55b of round cross section communicating with the opening 55a in the axial direction. The opening 55a and the axle hole 55b are configured to axially support the axle portion 51b of the axial support portion 51.

Figure 7:
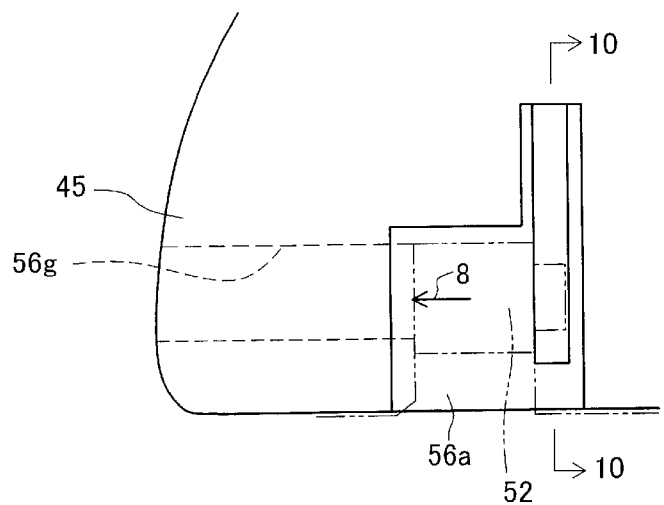
FIG. 7 is a front view showing an enlargement of the area around the axially supported portion of FIG. 6.
Figure 8:
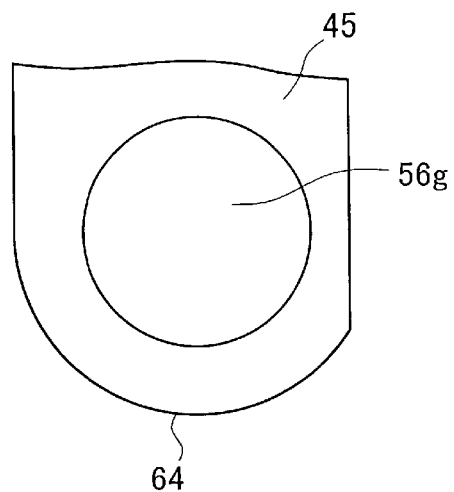
FIG. 8 is a diagram viewed in the direction of arrow 8 in FIG. 7.

The axially supported portion 56 comprises an opening 56a, and has a pin mounting hole 56g connecting with the opening 56a. FIG. 7 is a front view showing an enlargement of the area around the axially supported portion 56 of FIG. 6, and FIG. 8 is a diagram viewed in the direction of arrow 8 in FIG. 7. The pin mounting hole 56g communicating with the opening 56a is formed on the side of the opening 56a. Pin mounting hole 56g passes through the side of the handle 45. A pin 56h fits into the pin mounting hole 56g. The distal end of the pin 56h has a support insert 56i for insertion into an axle hole 52f.

(2)-5-3 Assembly of the Handle 45

Figure 9:
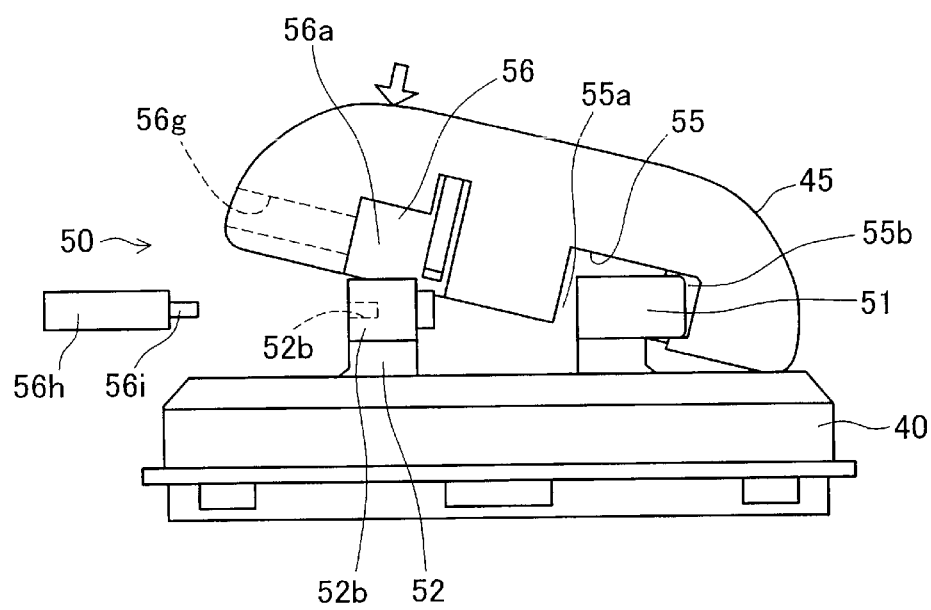
FIG. 9 is an illustrative diagram illustrating the procedure for assembling the handle to the cover.

FIG. 9 is an illustrative diagram illustrating the procedure for assembling the handle 45 to the cover 40. To assemble the handle 45 to the cover 40 by means of the axial support mechanism 50, the axial support portion 51 is mated with the axially supported portion 55, and then the axial support portion 51 is inserted into the opening 56a of the axially supported portion 56, the inserting the pin 56h into the pin mounting hole 56g; finally, the support insert 56i is mated with the axle hole 52. In this way the handle 45 may be rotatably mounted on the cover 40 via the axial support mechanism 50.

(2)-5-4 Urging Mechanism 57

Figure 10:
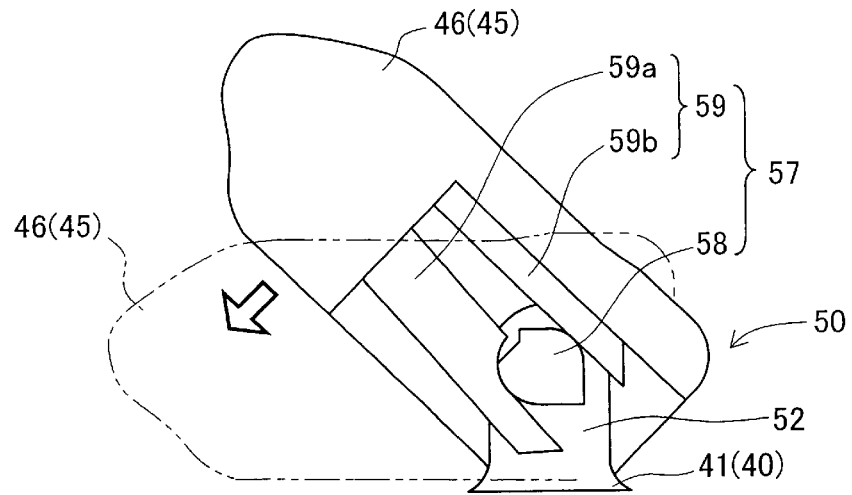
FIG. 10 is a sectional view taken along line 10—10 in FIG. 7.
Figure 11:
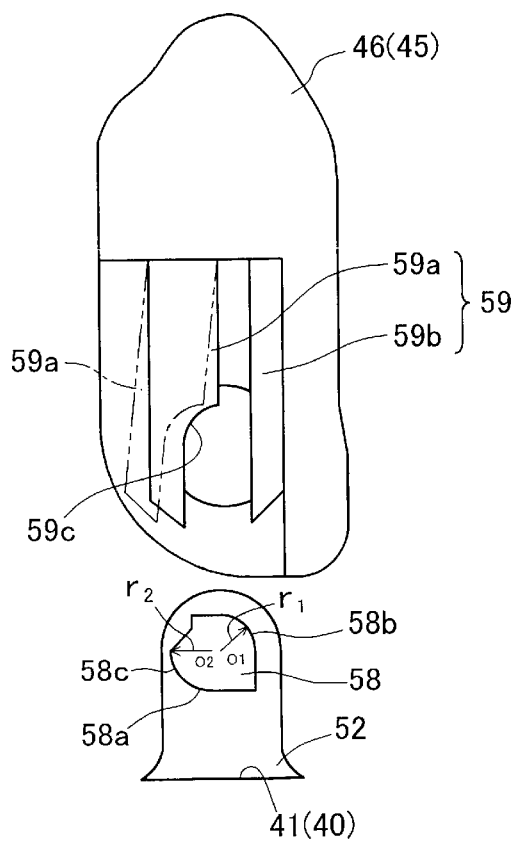
FIG. 11 is a sectional view showing the handle prior to being assembled with the axial support portion.

FIG. 10 is a sectional view taken along line 10—10 in FIG. 7, and FIG. 11 is a sectional view showing the handle 45 prior to being assembled. The handle 45 is urged towards the retracted position by means of the urging mechanism 57. The urging mechanism 57 comprises a cam 58 projecting from the side of the axial support portion 52, and a cam support portion 59 provided to the handle 45. In FIG. 11, a cam face 58a of the cam 58 is defined by center axis O1, an arcuate face 58b of substantially semicircular configuration of radius r1, a center O2 offset from center axis O1, and a curving convex face 58c of radius r2. The cam support portion 59 is bifurcated so that the cam face 58a is held between a resilient cam support piece 59a and a cam support rib 59b. The resilient cam support piece 59a is configured as a cantilever piece that resiliently flexes while following the cam face 58a as the handle 45 rotates. On the inside of the resilient cam support piece 59a is formed a cam guide face 59c conforming in shape to the arcuate face 58b. The cam support rib 59b is integrally formed with the handle body 46 and is arranged substantially parallel to the resilient cam support piece 59a.

Figure 12A:
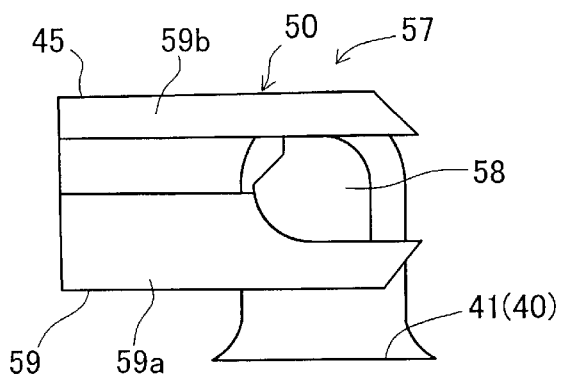
FIGS. 12A, 12B and 12C are illustrative diagrams illustrating the procedure for rotating the handle.
Figure 12B:
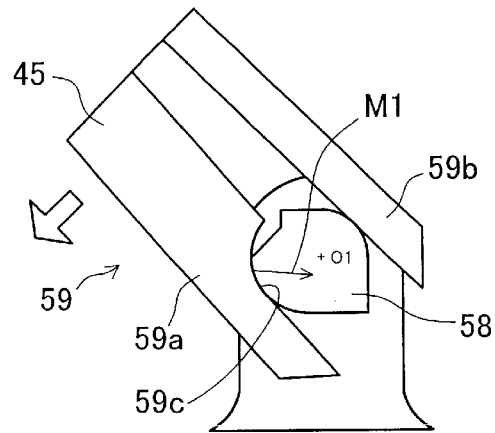
Figure 12C:
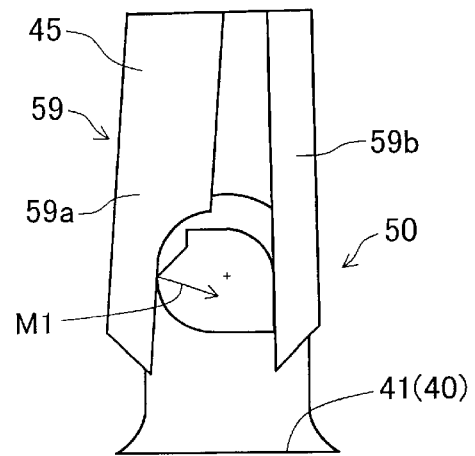

FIG. 12 illustrates the procedure for rotating the handle 45. The handle 45 is supported such that it can rotate within a 90° range by means of the axial support mechanism 50, that is, upraised from the retracted position pressed against the upper wall 41 of the cover 40 as shown in FIG. 12(A) to the position shown in FIG. 12(B), and finally to the upraised handling position shown in FIG. 12(C). When the handle 45 is not in the retracted position it is urged towards the retracted position (in the direction indicated by the arrow in FIG. 12(B)) by means of the urging mechanism 57. That is, when the handle 45 is positioned at an angle between the retracted position and the handling position, the resilient cam support piece 59a pushes under spring force against the arcuate face 58b of the cam 58, whereby the resilient cam support piece 59a exerts pushing force towards center O2. Since this pushing force is eccentric with respect to center axis O1 (which is the center of rotation of the handle 45), counterclockwise moment M1 is created. This moment M1 translates to force rotating the handle 45 about center axis O1. The handle 45 is thereby urged in the counterclockwise direction towards the retracted position from any position between the handling position and retracted position.

(2)-6 Clutch Mechanism 60

Figure 13:
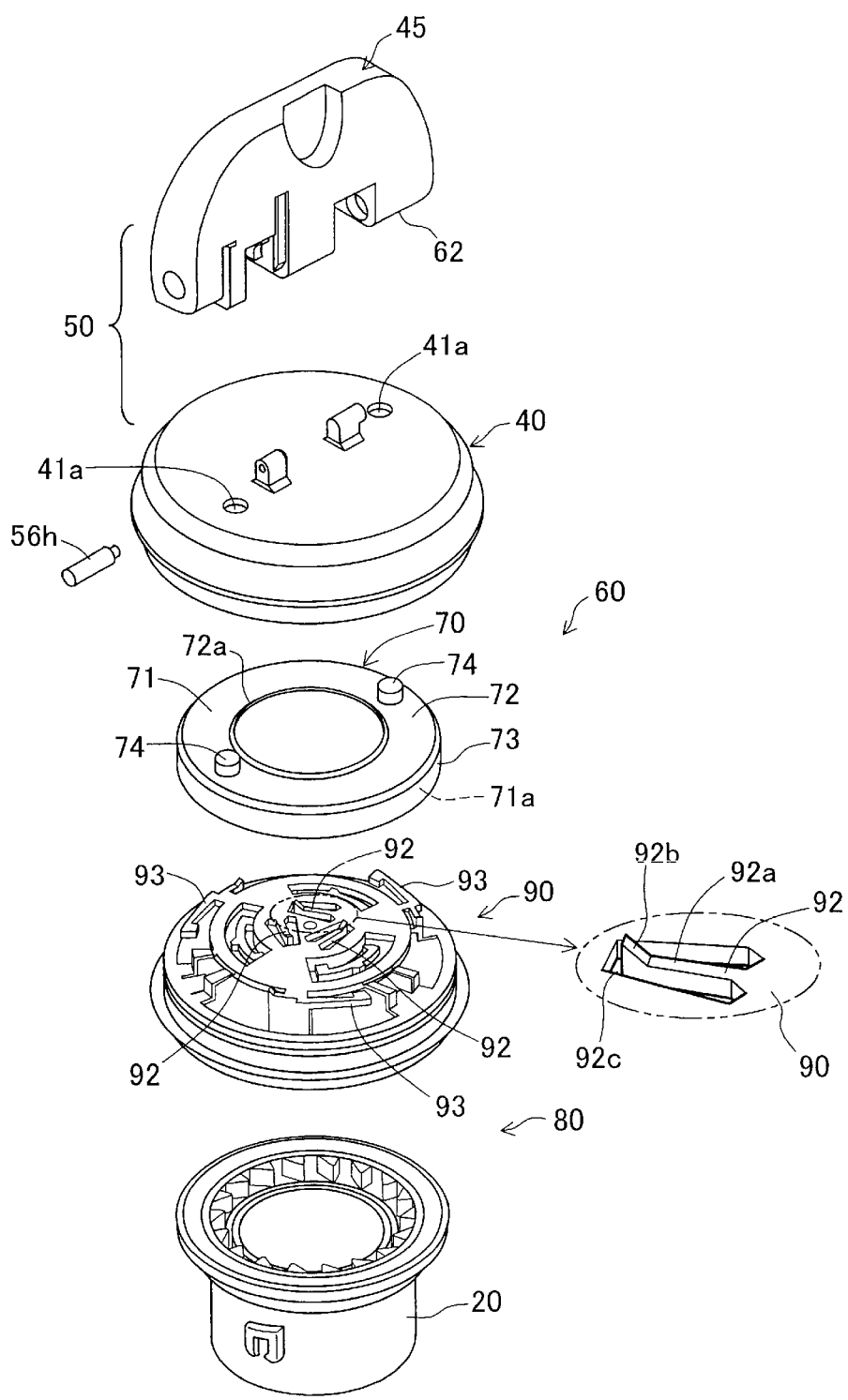
FIG. 13 is a perspective view showing the fuel cap disassembled.
Figure 14:
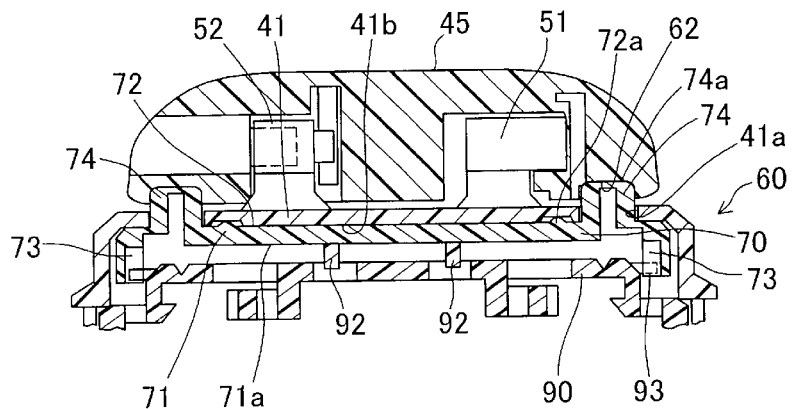
FIG. 14 is an illustrative diagram illustrating the clutch mechanism in non-interconnected mode.
Figure 15:
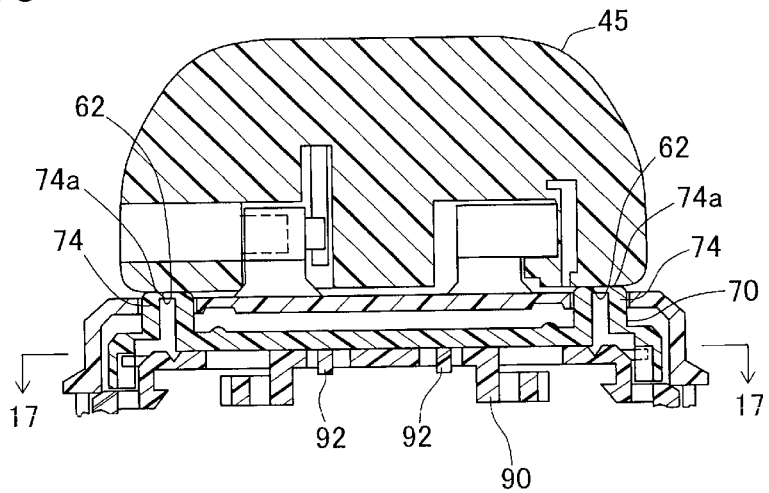
FIG. 15 is an illustrative diagram illustrating the clutch mechanism in interconnected mode.

FIG. 13 is a perspective view showing the fuel cap 10 disassembled, FIG. 14 is an illustrative diagram illustrating the clutch mechanism 60 in non-interconnected mode, and FIG. 15 is an illustrative diagram illustrating the clutch mechanism 60 in interconnected mode. The clutch mechanism 60 is a mechanism for transmission/non-transmission to the torque transmission mechanism 80 of rotational torque applied to the handle 45, and comprises a clutch member 70, a clutch spring 92 and the clutch arm 93 formed on the torque portion 90, and a cam face 62 formed on the lower face at both sides of the handle 45.

(2)-6-1 Clutch Member 70

In FIG. 13, the clutch member 70 is integrally molded by injection molding and comprises a clutch body 71. The clutch body 71 comprises an upper wall 72 of circular disk shape and a side wall extending downwardly from the outside edge of 72 so that the space surrounded by the upper wall 72 and the side wall 73 forms a storage recess 71a (see FIG. 14).

The upper wall 72 has an annular projection 72a projecting therefrom. As shown in FIG. 14 this annular projection 72a prevents the two from becoming wedged together so as to facilitate vertical motion of the clutch member 70. The upper wall 72 shown in FIG. 13 has buttons 74, 74 projecting therefrom at locations 180° apart with respect to the center of the clutch member 70. The buttons 74, 74 are retractably positioned in through-holes 41a formed in the cover 40.

(2)-6-2 Clutch Urging Mechanism 61

Three the clutch springs 92 are positioned at 120° intervals about the circumference on the upper face of the torque member 90. The clutch springs 92 impart spring force in the vertical direction relative to the clutch member 70. Each the clutch springs 92 comprises an arm 92a coplanar with the upper face of the torque member 90 and extending in the circumferential direction, and a pushing projection 92b projecting up from the upper face of the torque member 90 at the distal end of the arm 92a. The clutch springs 92 are of cantilever design, with one end thereof inclinable within a notch 92c in the upper face of the torque member 90, thereby urging the clutch member 70 upwardly.

Figure 16:
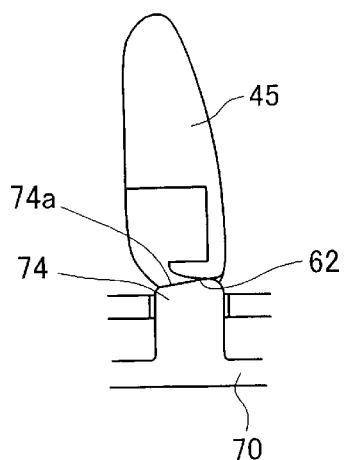
FIG. 16 is an illustrative diagram illustrating the relationship of the handle to the button of the clutch member.

FIG. 16 is an illustrative diagram illustrating the relationship of the handle 45 to the button 74 of the clutch member 70. The upper face of the button 74 is a sloped the pushing face 74a. A cam face 62 for pushing against the pushing face 74a is formed on the lower face of the handle 45 at both sides. The cam face 62 is designed so that with the handle 45 in the handling position, the button 74 of the clutch member 70 is pushed downwardly, and so that in the retracted position the button 74 s not pushed downwardly.

With this arrangement for the clutch urging mechanism 61, rotating the handle 45 from the retracted position shown in FIG. 14 to the handling position shown in FIG. 15 causes the cam face to push against the pushing faces 74a of buttons 74, 74, so that the clutch member 70 is pushed downwardly in opposition to the urging force of the clutch springs 92 and moves to the lower position, whereas in the retracted position, force ceases to be applied to buttons 74, 74 so that the clutch member 70 is returned to its original position by the clutch springs 92.

(2)-6-3 First Clutch Unit 63

Figure 17:
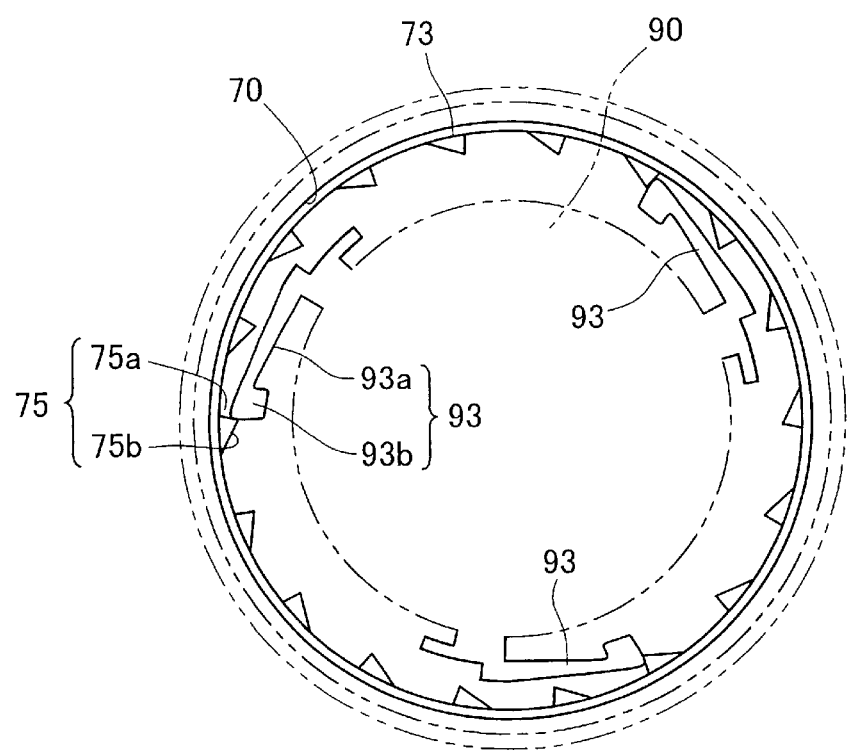
FIG. 17 is a sectional view taken in the vicinity line 17—17 in FIG. 15.

FIG. 17 is a sectional view taken in the vicinity line 17—17 in FIG. 15, and FIG. 18 illustrates operation of the first clutch unit 63. The first clutch unit 63 is a mechanism for transmitting rotational torque applied to the handle 45 in the closing direction, regardless of whether the handle is in the handling position or retracted position.

The first clutch teeth 75 are formed all the way around the inside rim of the side wall 73 of the clutch member 70. The first clutch teeth 75 comprise a right-angled the interlocking face 75a extending in the radial direction and a sloping face 75b inclined a predetermined angle with respect to the interlocking face 75a; the teeth are substantially right triangular in shape when viewed in cross section.

On the outside rim of the torque member 90 there are provided clutch arms 93 for interlocking with interlocking faces 75a. The clutch arms 93 are positioned at 120° intervals about the circumference on the upper outside rim of the torque member 90. Each the clutch arm 93 comprises an arm 93a extending along the circumferential direction, and a interlocking end 93b provided at the distal end of the arm 93a. The interlocking end 93b is formed by a surface in the radial direction so as to interlock with a interlocking face 75a. The interlocking face 75a is thicker than the interlocking end 93b so as to normally maintain the interlocked state regardless of whether positioned above (FIG. 18(A)) or below (FIG. 18(B)) the torque member 90 of the clutch member 70.

Figure 18A:
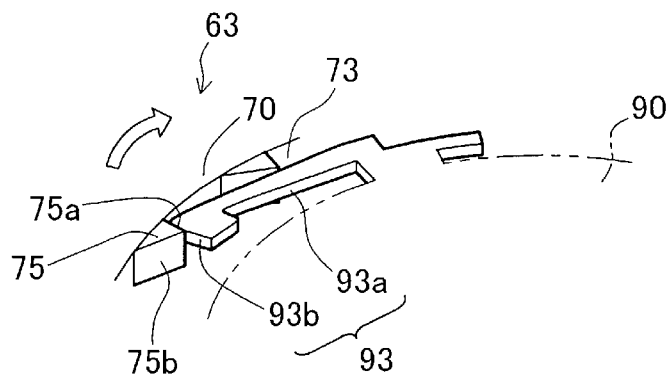
FIGS. 18A, 18B and 18C are illustrative diagrams illustrating operation of the first clutch unit.

As shown in FIGS. 18(A) and (B), when the clutch member 70 is rotated in the clockwise direction, the interlocking end 93b interlocks with the interlocking face 75a, creating a torque transmission state in which the torque member 90 rotates in unison therewith in the clockwise direction. This torque transmission state is maintained regardless of whether the handle 45 is in the handling position of FIG. 18(A) or the handling position of FIG. 18(B), since in either state the interlocking face 75a of the clutch member 70 is in abutment with the interlocking end 93b.

Figure 18B:
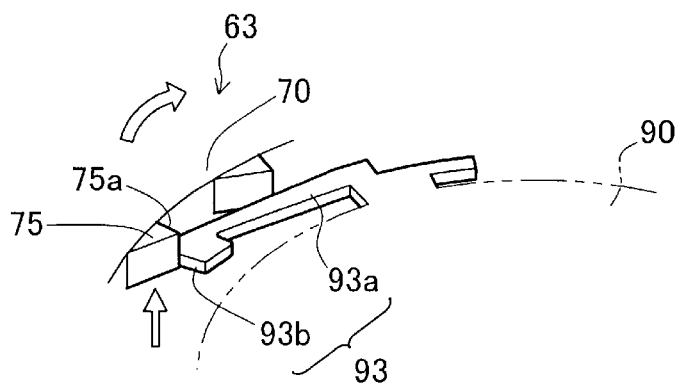
Figure 18C:
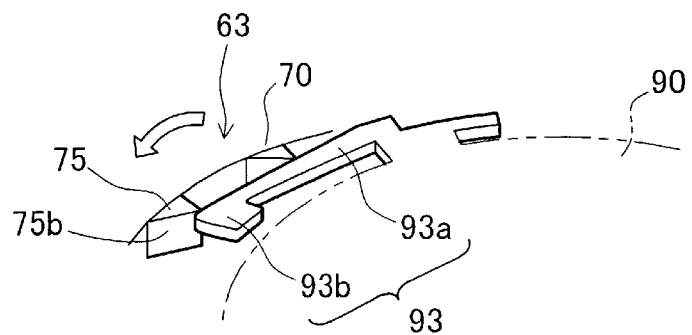

On the other hand when the clutch member 70 is rotated in the counterclockwise direction as illustrated in FIG. 18(C), there results a non-interconnected mode in which the sloping face 75b of the first clutch teeth 75 follows along the outside face of the arm 93a so that the torque member 90 does not rotate. In this way the first clutch teeth 75 and clutch arms 93 constitute a one-way clutch mechanism which normally interlocks in the clockwise direction (closing direction) to transmit rotational torque, and which does not transmit rotational torque in the counterclockwise direction (opening direction).

(2)-6–4 Second Clutch Unit 65

Figure 19:
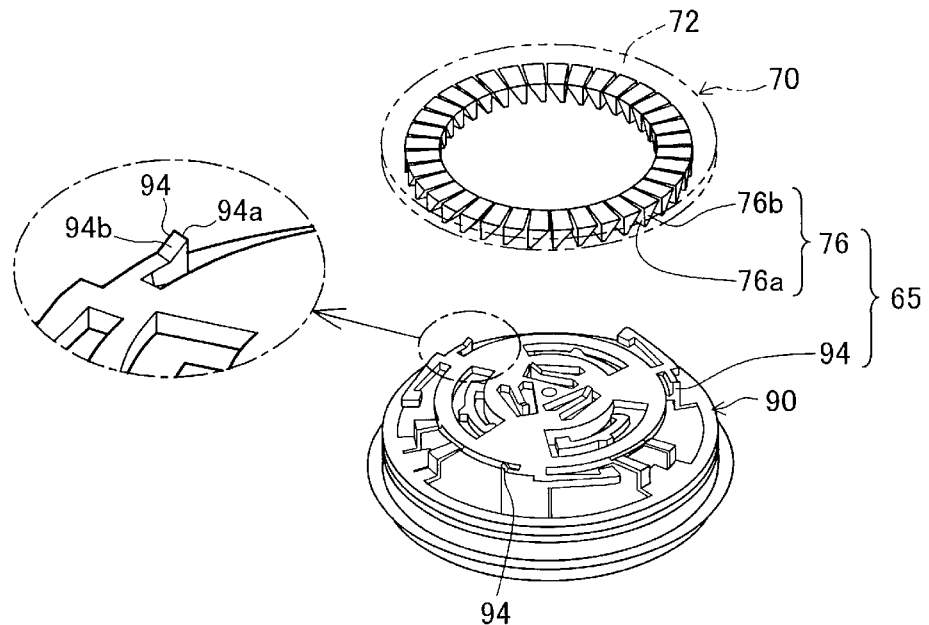
FIG. 19 is an illustrative diagram illustrating the second clutch unit.

FIG. 19 is an illustrative diagram illustrating the second clutch unit 65. The second clutch unit 65 is a mechanism for transmitting rotational torque applied in the opening direction to the handle 45, only when the handle is in the handling position.

The second clutch teeth 76 are formed all the way around the bottom outside rim of the upper wall 72 of the clutch member 70. Each the second clutch teeth 76 comprises a substantially vertical the interlocking face 76a and a sloping face 76b inclined by a predetermined angle with respect to the interlocking face 76a, to produce a substantially right triangular cross section.

On the upper face of the torque member 90 are formed second clutch interlocking portions 94 for interlocking with the second clutch teeth 76. The second clutch interlocking portions 94 are positioned at 120° intervals about the circumference in the upper portion of the torque member 90. Each the second clutch interlocking portion 94 comprises a vertical interlocking face 94a interlocking with a interlocking face 76a, and a sloping face 94b abutting a sloping face 76b.

Figure 20A:
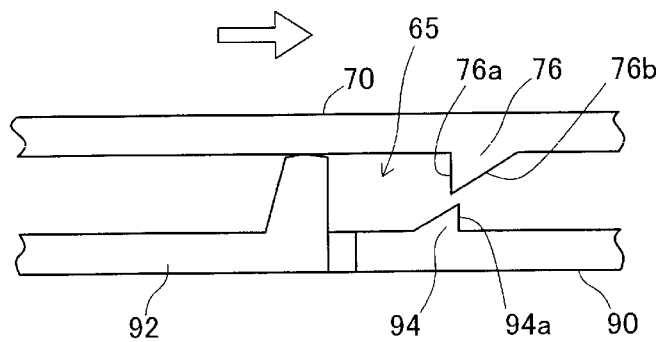
FIGS. 20A and 20B are illustrative diagrams illustrating operation of the second clutch unit.

FIG. 20 illustrates operation of the second clutch unit 65. As shown in FIG. 20(A), when the clutch member 70 is positioned upwardly by the spring force of the clutch spring 92 of the clutch mechanism 60, the interlocking faces 76a of the clutch member 70 are not interlocked with the interlocking faces 94a of clutch interlocking portions 94. Therefore the torque member 90 does not rotate even if the clutch member 70 is rotated.

Figure 20B:
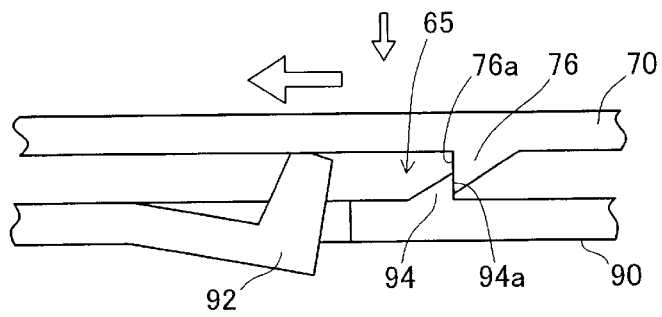

As shown in FIG. 20(B), when the clutch member 70 is positioned downwardly in opposition to the spring force of the clutch spring 92 of the clutch mechanism 60, the interlocking faces 76a of the clutch member 70 interlock with the interlocking faces 94a of clutch interlocking portions 94. Turning the clutch member 70 in the counterclockwise direction (opening direction) causes the torque member 90 to rotate in unison therewith in the same direction. In this way, the second clutch teeth 76 and second clutch interlocking portions 94 constitute a one-way clutch mechanism that transmits rotational torque only when the torque member 90 is in the down position, while not transmitting rotational torque in the clockwise direction.

(2)-7 Structure of the Torque Member 90

Figure 21:
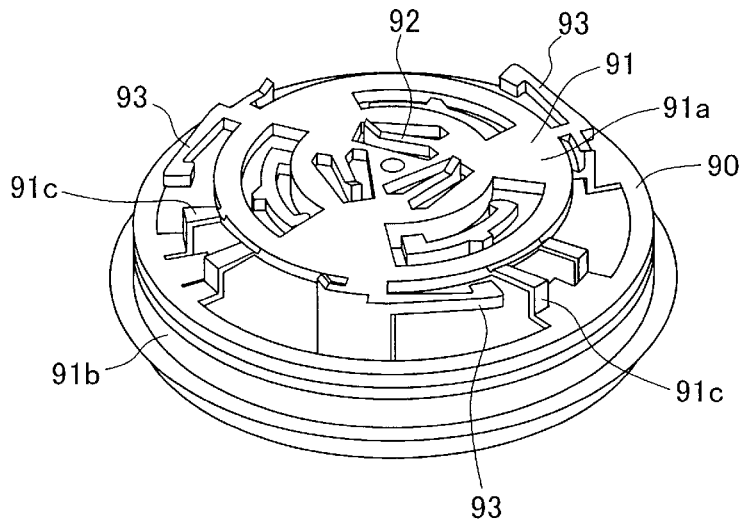
FIG. 21 is a perspective view showing the torque member.

FIG. 21 is a perspective view showing the torque member 90. The torque member 90 comprises a two-stage disk of resin having a projecting portion and interlocking portion in its center. That is, the torque member 90 comprises a torque plate body 91. The torque plate body 91 comprises an upper disk 91a, an annular portion 91b situated at the outside bottom of the upper disk 91a, and connector portions 91c connected at three locations to the annular portion 91b. The upper disk 91a comprises a clutch spring 92 which carries the clutch mechanism 60 described earlier, and is provided on its outside edge with clutch arms 93.

(2)-7-1 Torque Member 90 Mounting Structure

Figure 22:
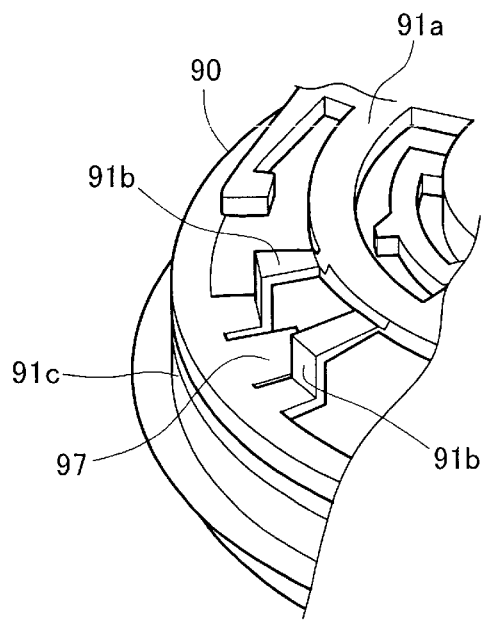
FIG. 22 is a perspective view showing principal elements of the torque member enlarged.
Figure 23:
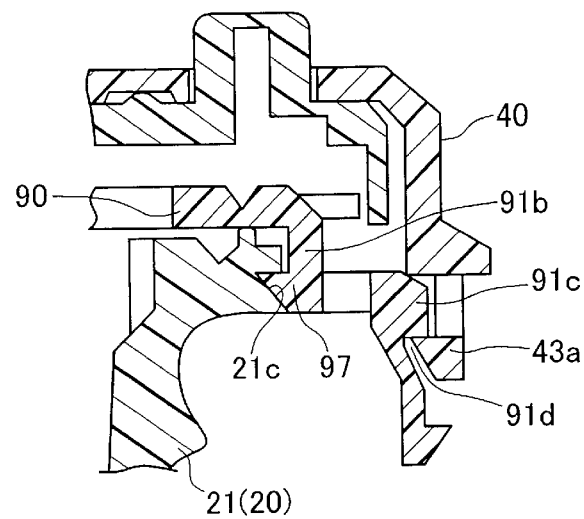
FIG. 23 is a sectional view of the area around the top of the casing body.

As shown in FIG. 22, the interlocking claws 97 are formed on the inside rim of the annular portion 91b of the torque member 90. The interlocking claws 97 are configured as tongue pieces extending towards the center of the torque member 90 and are resiliently deformable in the axial direction. FIG. 23 is a sectional view of the area around the top of the casing body 20. An interlocking recess 21c is formed around the upper outside rim of the outer tube 21 of the casing body 20. The interlocking claws 97 are forced into the interlocking recess 21c to rotatably mount the torque member 90 on the upper outside rim of the casing body 20.

An interlocking recess 91d is formed around the outside rim of the annular portion 91b, allowing the cover 40 of the torque member 90 to be rotatably supported within the interlocking recess 91d by detaining therein the support projection 43a on the inside wall of the side wall 43 of the cover 40 (see FIG. 1).

(2)-7-2 Structure of the Torque Transmission Mechanism 80

The torque transmission mechanism 80 shown in FIG. 1 is a mechanism that enables confirmation that the fuel cap 10 has been attached to the filler neck FN at a predetermined level of rotational torque, by providing the user with a tactile warning if excessive rotational torque above a predetermined level is applied to the handle 45 during the operation of closing the filler opening FNb with the fuel cap 10.

Figure 24:
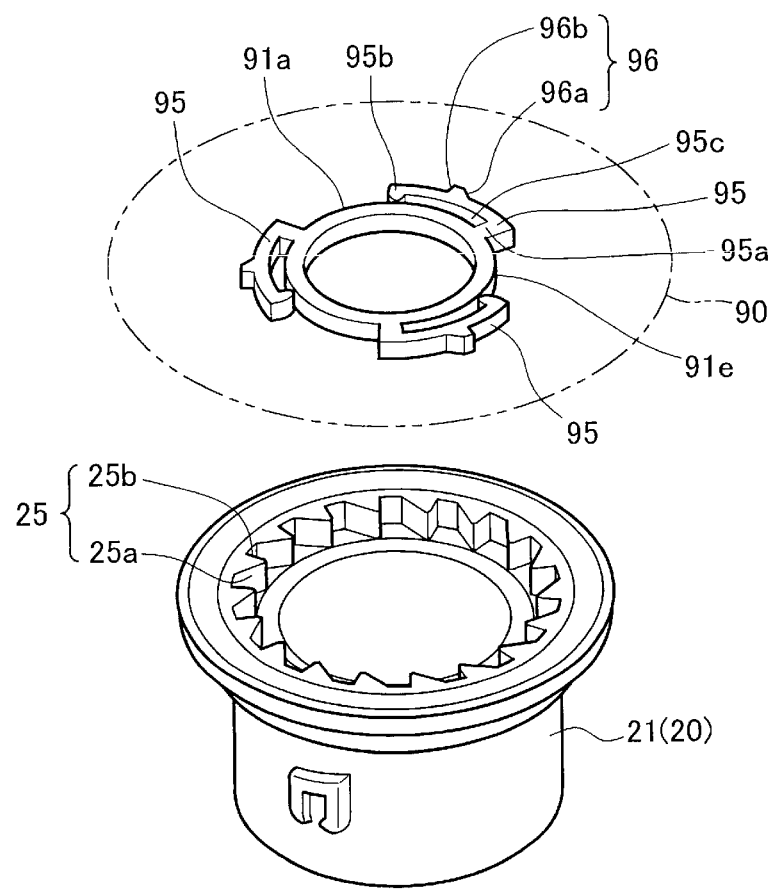
FIG. 24 is a perspective view showing the torque transmission mechanism.
Figure 25:
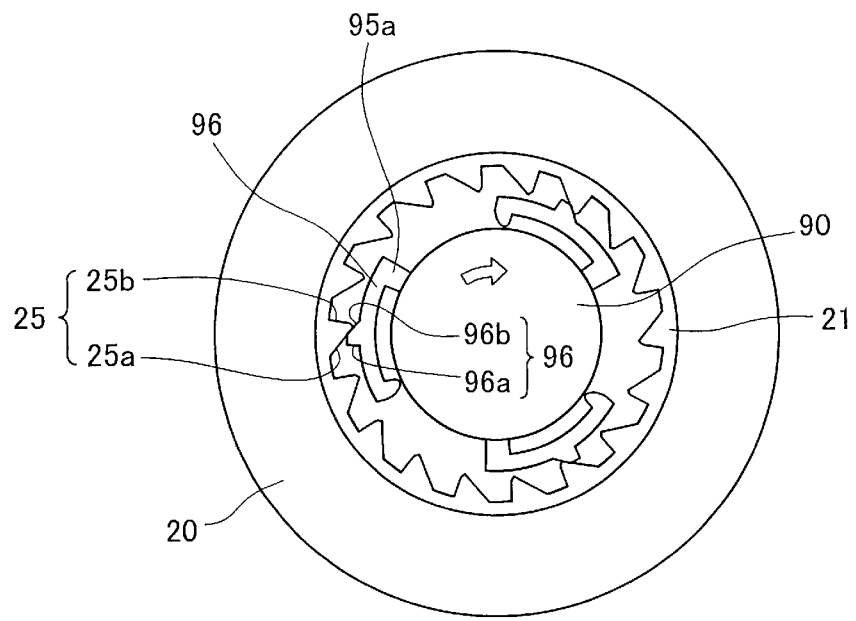
FIG. 25 is a plan view showing the torque transmission mechanism.

FIG. 24 is a perspective view showing the torque transmission mechanism 80, and FIG. 25 is a plan view showing the torque transmission mechanism 80. The upper inside rim of the outer tube 21 has formed thereon a body interlocking portion 25 constituting part of the torque transmission mechanism 80, described later. The body interlocking portion 25 extends around the entire inside circumference of the outer tube 21 and has a peak configuration composed of a first interlocking face 25a slanted substantially in the circumferential direction and a second interlocking face extending substantially in the radial direction.

Figure 26:
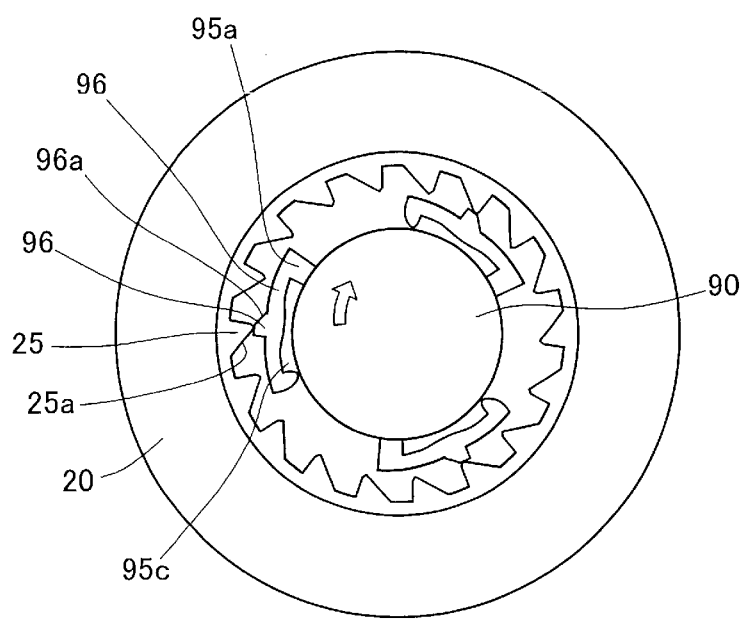
FIG. 26 is an illustrative diagram illustrating operation carrying over from FIG. 25.

An inner annular portion 91e of hollow cylindrical configuration is formed in the bottom of the upper disk 91a of the torque member 90, and three the resilient torque pieces 95 are formed at 120° intervals about the circumference on the outside edge of the inner annular portion 91e. As shown in FIG. 25, the resilient torque pieces 95 take the form of arched cantilever pieces having their support points at the supporting terminal portions 95a, and having the torque piece interlocking portions 96 projecting from their outside edges, with the spaces 95c to the inside of the torque piece interlocking portions 96. Each the torque piece interlocking portion 96 has a first interlocking face 96a formed on a first face thereof and a second interlocking face 96b formed on a second face. First interlocking face 96a is configured so as to come into abutment at a vertical face thereof with a first interlocking face 25a of the body interlocking portion 25 with clockwise rotation of the torque member 90; when pushed in the radial direction from the center by a body interlocking portion 25 the torque piece interlocking portions 96 undergoes resilient deformation so as to the constrict space 95c, as shown in FIG. 26.

(2)-7-3 Torque Member 90 Breaking Mechanism

Figure 28A:
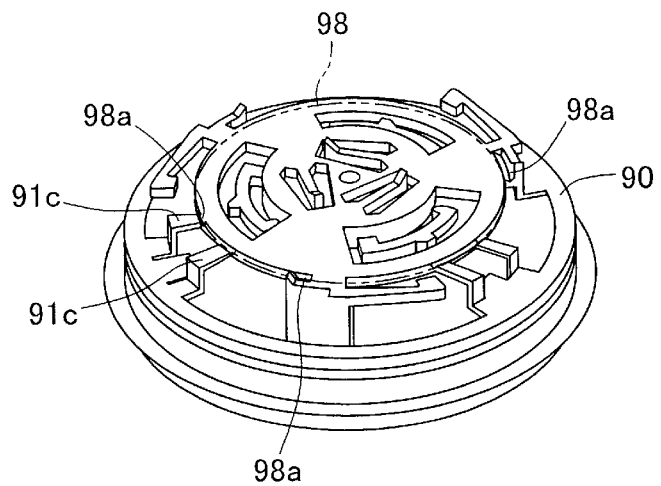
FIGS. 28A and 28B are illustrative diagrams illustrating frangible portion of the torque portion.

As shown in FIG. 28(A), the frangible grooves 98a constituting part of the frangible portions 98 are formed along the outside edge of the upper disk 91a of the torque member 90, between it and the connector portion 91c. The frangible grooves 98a are located at three areas in the circumferential direction, these the frangible grooves 98a being provided along the circumference of a circle connecting the cutout portions between connector portions 91c in the circumferential direction.

Figure 28B:
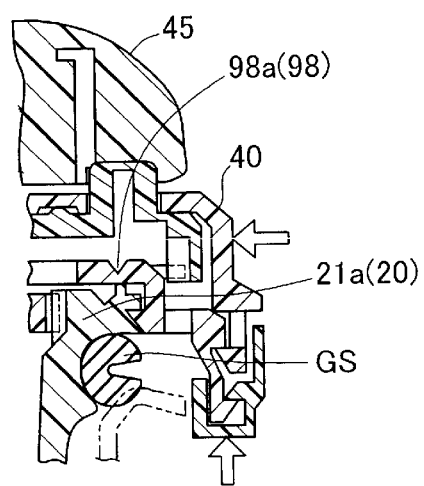

Referring now to FIG. 28(B), if the cover 40 or the handle 45 should be subjected to a strong external force such as that produced in an automobile collision, the frangible portions 98 supporting the cover 40 will separate at the outside edges thereof or the interlocking claws 97 will detach from the interlocking recess 21c beginning at the frangible portions 98. At this time the seal retaining portion 21a of the casing body 20 supporting the gasket GS is not damaged so that the seal is not lost. An additional reason for providing the torque member 90 with the frangible portions 98 is that by forming the frangible portions 98 in the upper portion of the casing body 20 there are no limitations as to the shape of the seal retaining portion 21a, making it a simple matter to optimize breaking load for external forces in various directions.

(2)-8 Tether Mechanism 100

Figure 29:
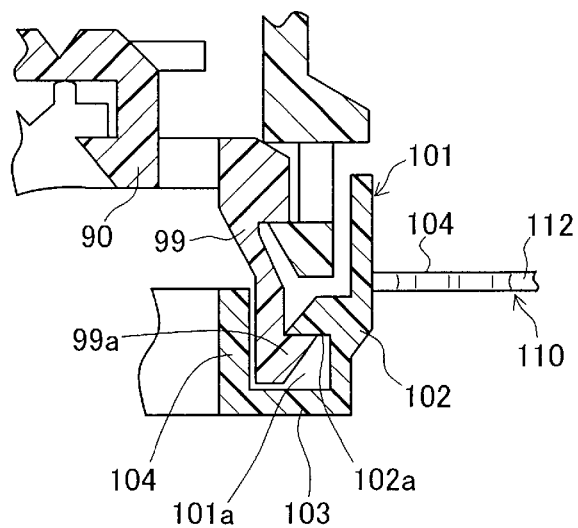
FIG. 29 is a sectional view of the area around the tether mechanism.
Figure 30:
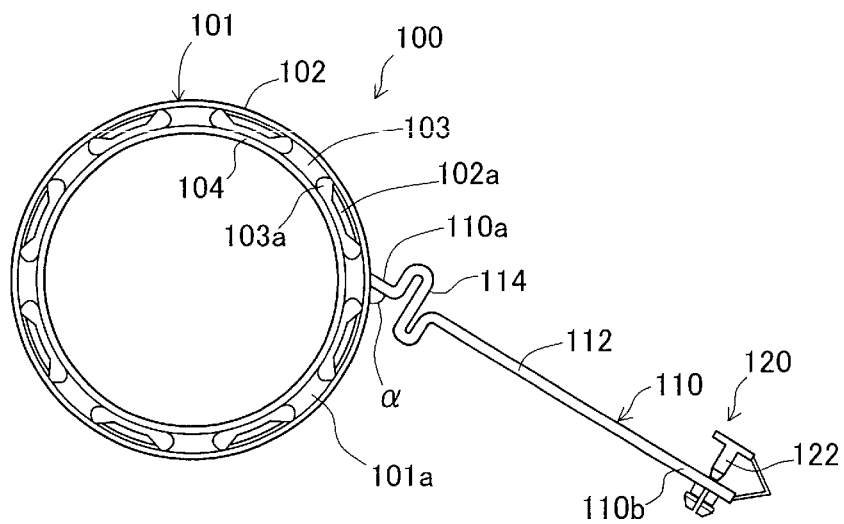
FIG. 30 is a plan view of the tether mechanism.
Figure 31:
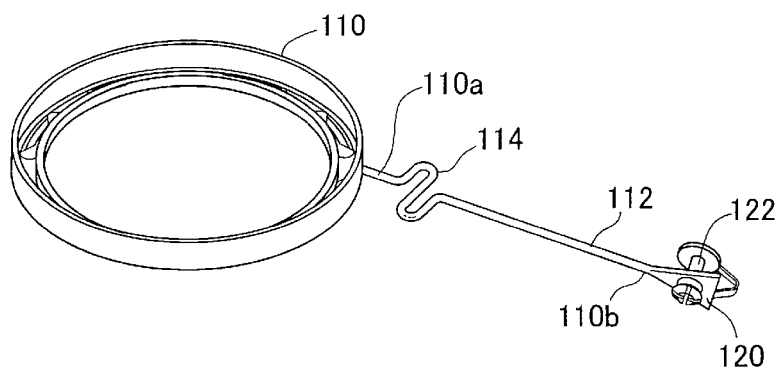
FIG. 31 is a perspective view illustrating the tether mechanism.

FIG. 29 is a sectional view of the area around the tether mechanism 100, FIG. 30 is a plan view of the tether mechanism 100, and FIG. 31 is a perspective view illustrating the tether mechanism 100. The tether mechanism 100 is designed to prevent the fuel cap 10 from falling off or becoming lost during fueling, and comprises a tether rotation support 101, a connector member 110, and a support end 120. As shown in FIG. 29, the tether rotation support 101 is rotatably supported on one end of a support wall 99 of the torque member 90. Specifically, the tether rotation support 101 has an annular configuration extending all the way around the support wall 99 and has an open square cross section defined by an outer the annular outer wall 102, the floor 103 and annular the inner wall 104, with an annular recess 101a therebetween. The outer the annular outer wall 102 is taller than annular the inner wall 104. The interlocking projections 102a project from the inside face of the annular outer wall 102. As shown in FIG. 30, the interlocking projections 102a are situated at six locations equal distances apart along the circumference, and when the interlocking claws 99a of the support wall 99 are snapped into the annular recess 101a these interlock with the interlocking projections 102a as shown in FIG. 29 so that the tether rotation support 101 is rotatably supported on the torque member 90.

The tether mechanism 100 is integrally molded by injection molding of thermoplastic elastomer (TPEE) or thermoplastic resin (e.g. PP). As shown in FIG. 30 a first end of the connector member 110 is connected to the tether rotation support 101, inclined with respect thereto by a predetermined angle (5°–180°). The connector member 110 comprises a connector member body 112 and a flex portion 114. The flex portion 114 is located in proximity to a first connecting end 110a at one end of the connector member 110. Flex portion 114 is composed of inverted "U" shapes connected together in a substantially "S" configuration and is coplanar with the tether rotation support 101 so that when subjected to force in the direction indicated by arrow d1 in FIG. 32 the connector member body 112 will bend along the outside perimeter of the cover 40.

Figure 34:
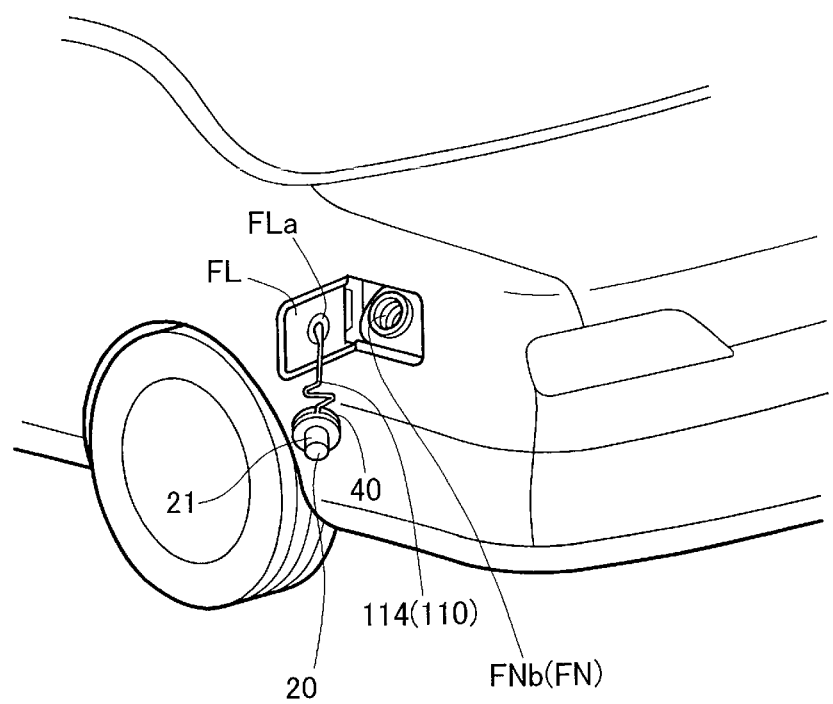
FIG. 34 is a perspective view showing the rear end of a vehicle being fueled with the fuel cap detached from the filler neck.

In FIG. 31 a support end 120 is formed at a second connecting end 110b at the other end of the connector member 110. The support end 120 is of tabular configuration fanning out towards the distal end and is formed by twisting at a right angle, i.e. 90°, with respect to the connector member 110. A detent projection 122 projects from the support end 120. As shown in FIG. 34, the detent projection 122 is rotatably supported on a support portion formed on the back face of the fuel cover FL. When fuel cover FL is opened away from the filler neck FN the fuel cap 10 is suspended via the connector member 110 fixed to the support end 120. When at this point the fuel cap 10 is released the cover 40 of the fuel cap 10 drops toward the exterior panel of the vehicle, suspended away from the vehicle panel due to the 90° bend with respect to the connector member 110, enabling the fueling operation. That is, the fuel cap is located away from the vehicle panel during fueling and therefore does not interfere with the fuel nozzle and preventing fuel on the casing body 20 from dripping onto the vehicle panel.

Figure 32:
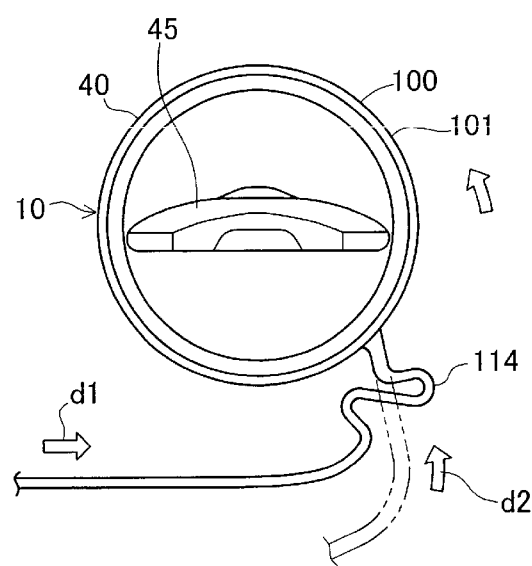
FIG. 32 is a perspective view illustrating operation of the tether mechanism.

With the fuel cap 10 removed, the fuel cap 10 is then replaced in the filler opening FNb of the filler neck FN and the handle 45 turned in the closing direction shown in FIG. 32; as the tether rotation support 101 is rotatable with respect to the torque member 90 (FIG. 29), and as the connector member 110 is not subjected to any appreciable force from the fuel cover FL or the fuel cap 10 so as to remain slack on a substantially straight line, the opening/closing operation of the fuel cap 10 is not impaired. At this time the connector member 110 flexes at the flex portion 114 so that the connector member body 112 flexes along the outside perimeter of the cover 40.

Figure 33:
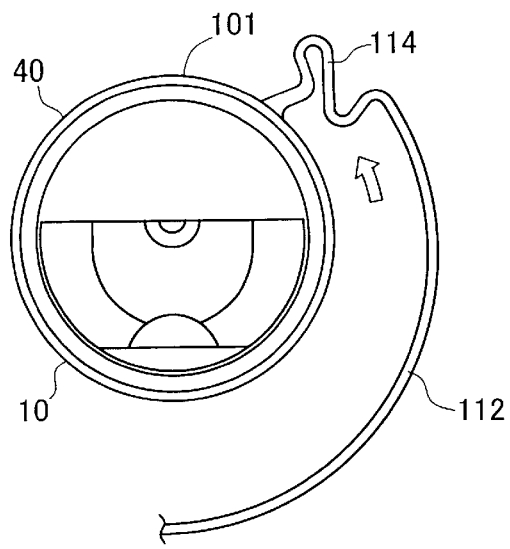
FIG. 33 is an illustrative diagram illustrating operation carrying over from FIG. 32.

When fuel cover FL (FIG. 34) is subsequently shut the connector member body 112 is pushed longitudinally from the position illustrated in FIG. 32 in association with the motion of fuel cover FL. Longitudinal force on the connector member body 112 is converted to force tending to rotate the tether rotation support 101 in the counterclockwise direction so that the tether rotation support 101 rotates smoothly causing the connector member body 112 to coil around the cover 40 as illustrated in FIG. 33. Since the connector member body 112 coils around the cover 40 in this way it can be accommodated within the space behind the fuel cover FL and does not hinder opening and closing of the fuel cover FL.

As shown in FIG. 29, the tether rotation support 101 of the tether mechanism 100 is supported by a torque member 90 of polyacetal having a smooth surface, enabling it to rotate smoothly about the outside rim of the torque member 90 so that the opening/closing operation of the fuel cap 10 is not impaired. The torque member 90 is moreover fabricated of highly swelling-resistant polyacetal and therefore experiences negligible change in shape that would increase outside diameter, so that the ability of the tether rotation support 101 to rotate is not diminished. Further, as the tether rotation support 101 is formed of pliable thermoplastic elastomer (TPEE) or thermoplastic resin (PP) bending thereof at the flex portion 114 can be assured.

(3) Fuel Cap 10 Assembly Procedure

To assemble the fuel cap 10, first, the handle 45 is attached to the cover 40 as shown in FIG. 9. The regulator valve 35 is also installed in the valve chamber 24 of the casing body 20 as shown in FIG. 1, and the flange 32 of the inner cover 30 is ultrasonically welded onto the upper portion of the valve chamber molding 22. Next, as shown in FIG. 23, the interlocking claws 97 of the torque member 90 are forced into the interlocking recess 21c of the casing body 20 to attach the torque member 90 to the casing body 20. The button 74 of the clutch member 70 is aligned with the through-hole 41a in the cover 40, attaching the clutch member 70 to the cover 40 and then interlocking the support projection 43a of the cover 40 with the interlocking recess 91d to attach the cover 40 onto the torque member 90. Then as shown in FIG. 29 the tether rotation support 101 of the tether mechanism 100 is forced over the interlocking claws 99a of the support wall 99 to attach the tether mechanism 100 to the torque member 90. This completes assembly of the fuel cap 10.

(4) Fuel Cap 10 Operation

Following is a description of the opening and closing operation when attaching or replacing the fuel cap 10 in the filler opening FNb of the filler neck FN.

(4)-1 Fuel Cap 10 Closing Operation

With the fuel cap 10 detached from filler opening FNb, the handle 45 is pulled upright with the fingers as shown in FIG. 14, whereupon the handle 45 rotates about axial support portions 51, 52 shown in FIG. 14, in opposition to the spring force of the urging mechanism 57 (see FIG. 10) and the clutch spring 92 (see FIG. 20). Rotation of the handle 45 causes the cam face 62 to push against the pushing face 74a of the button 74 of the clutch member 70. The clutch member 70 then moves downwardly in opposition to the urging force of the clutch spring 92 of the torque member 90 as shown in FIG. 15.

Next, as shown in FIG. 3 the casing interlocking portion 20a of the casing body 20 is aligned with the neck insertion notch FNd of the filler neck FN and inserted therein in the axial direction. Clockwise force is then applied to the handle 45 and is transmitted to the clutch member 70 via the cover 40, the cover 40 the through-hole 41a and the button 74 of the clutch member 70, causing the clutch member 70 to rotate. Since the interlocking faces 75a of the first clutch teeth 75 normally interlock with the interlocking ends 93b of clutch arms 93 of the torque member 90 as shown in FIG. 18(A), the torque member 90 rotates in tandem with rotation of the clutch member 70. It should be noted that even if the user does not move the handle 45 to the handling position, i.e., even with the handle in the retracted position, the interlocking ends 93b are interlocked with the interlocking faces 75a as shown in FIG. 18(B) so that rotational torque is transmitted from the clutch member 70 to the torque member 90.

As the torque member 90 rotates, the first interlocking faces 96a of the torque piece interlocking portions 96 of the torque member 90 press against first interlocking faces 25a of body interlocking portions 25 at the interlock locations illustrated in FIG. 25. This causes the handle 45, the cover 40, the clutch member 70, the torque member 90 and the casing body 20 to rotate in unison in the direction of closing the filler opening FNb, with the casing interlocking portions 20a (see FIG. 3) interlocking with opening interlocking portion FNc with increasing force. When reaction force created by this interlocking force exceeds a predetermined level of rotational torque, the torque piece interlocking portions 96 in the state shown in FIG. 26 now ride over the body interlocking portions 25.

At this point the first interlocking faces 96a of the torque piece interlocking portions 96 are forced in the radial direction by the reaction force from the first interlocking faces 25a, causing the resilient torque pieces 95 to resiliently deform so as to constrict the width of the spaces 95c, so that the torque piece interlocking portions 96 ride up over body interlocking portions 25. This provides to the user with a tactile warning of over-tightening. In this state the fuel cap 10 is attached to the filler opening FNb at a predetermined level of tightening torque.

When the handle 45 is subsequently released it is subjected to spring force created by the resilient cam support piece 59a pinching the cam face 58 (see FIG. 36) and to the spring force of the clutch spring 92 transmitted to handle via the button 74, and rotates about axial support portions 51, 52 to return to the retracted position.

(4)-2 Fuel Cap 10 Closed State

In the state shown in FIG. 1, the handle 45, the cover 40, and the clutch member 70 are not constrained in the opening direction (counterclockwise direction) by the torque member 90 and the casing body 20, and thus rotate freely. Thus, if the cover 40 and/or the handle 45 should be subjected to external force as in a collision, they will simply turn freely without rotational torque being transmitted to casing member 20 through the torque transmission mechanism 80, so that there is no loss of seal.

(4)-3 Procedure for Opening the Fuel Cap 10

The procedure for opening the fuel cap 10 is initiated by pulling up the handle 45 as shown in FIG. 15. This causes the cam face 62 in the lower center of the handle 45 to push against the pushing face 74a of the button 74 of the clutch member 70, so that the clutch member 70 moves downwardly. In this state, turning the handle 45 counterclockwise causes the interlocking faces 76a of the second clutch teeth 76 to interlock with the interlocking faces 94a of second clutch interlocking portions 94 as shown in FIG. 20(B), so that the torque member 90 rotates in the counterclockwise direction in tandem with rotation of the clutch member 70 in the same direction.

Figure 27:
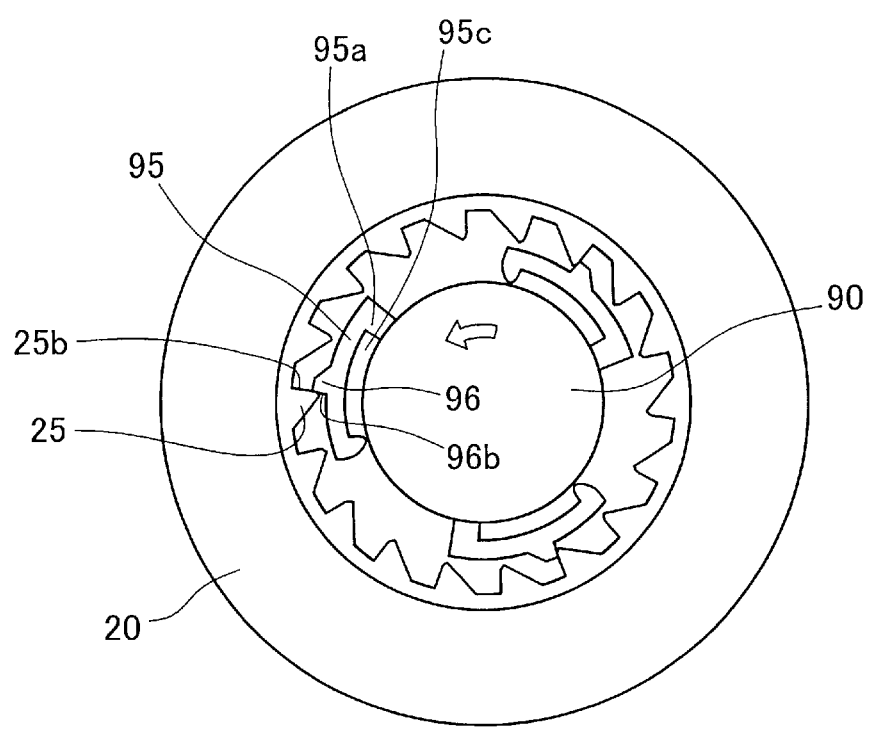
FIG. 27 is an illustrative diagram illustrating operation carrying over from FIG. 26.

In this state, the second interlocking faces 96b of the torque piece interlocking portions 96 interlock with the second interlocking faces 25b of body interlocking portions 25 as shown in FIG. 27. The second interlocking faces 96b and the second interlocking faces 25b come into abutment substantially in the radial direction and do not produce center-directed force tending to cause the resilient torque pieces 95 to constrict the spaces 95c, so that the torque piece interlocking portions 96 do not ride over body interlocking portions 25, but instead transmit rotational torque applied to the handle 45 to the casing body 20. As a result the handle 45, the cover 40, the clutch member 70, the torque member 90 and the casing body 20 rotate in unison in the clockwise direction.

The casing interlocking portion 20a then comes away from the opening interlocking portion FNc of the filler neck FN so that the casing body 20 is released from the constraining force of the filler neck FN. The fuel cap 10 can now be removed from the filler neck FN by pulling out in the axial direction.

(4)-4 Operation of the Handle 45 the Urging Mechanism 57

Figure 35A:
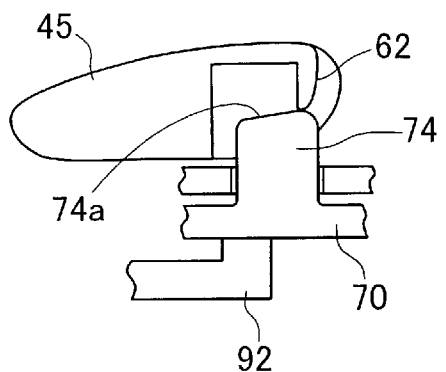
FIGS. 35A, 35B and 35C are illustrative diagrams illustrating operation of the handle.
Figure 35B:
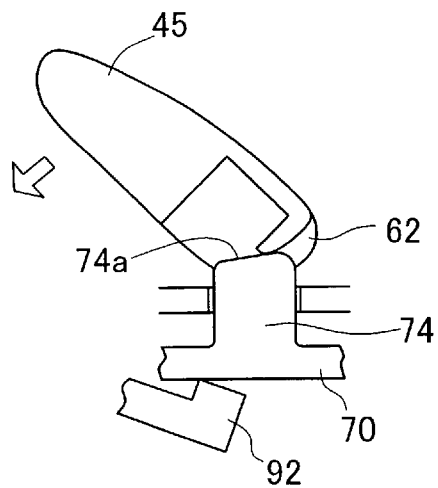
Figure 35C:
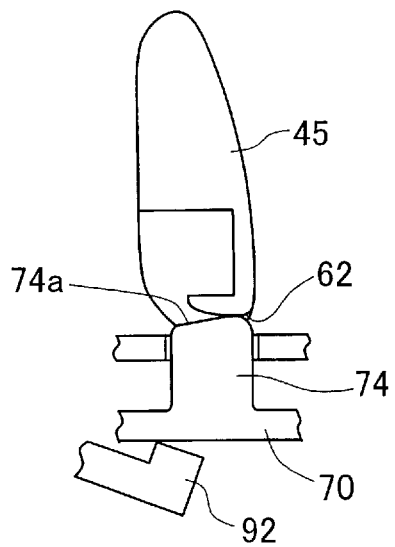
Figure 36A:
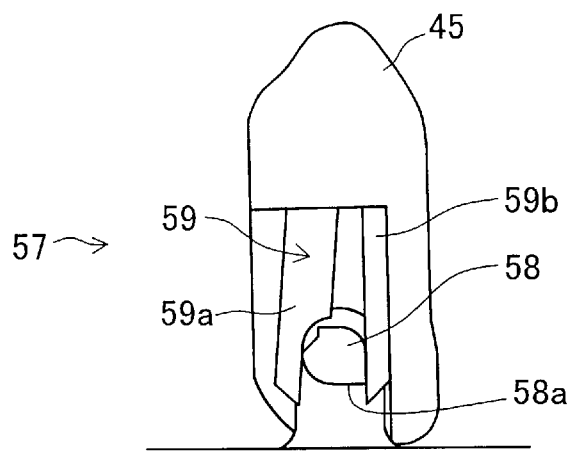
FIGS. 36A, 36B and 36C are illustrative diagrams illustrating operation of the handle.
Figure 36B:
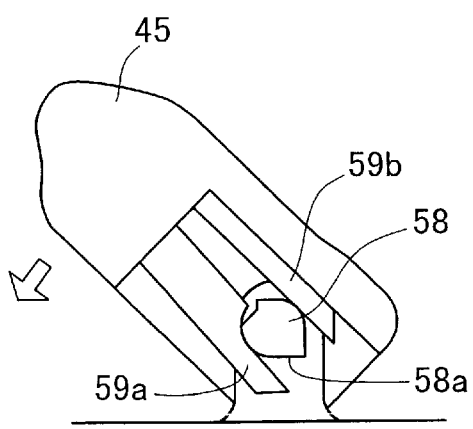
Figure 36C:
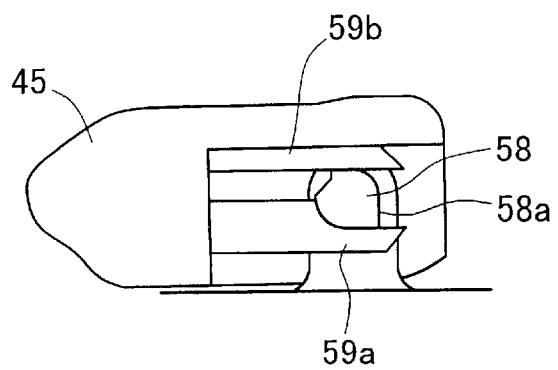

FIG. 35 illustrates the return operation of the handle 45 by the clutch spring 92, and FIG. 36 illustrates the return operation of operation of the handle 45 by the urging mechanism 57. When opening or closing the handle 45, the handle 45 is rotated from the retracted position to the handling position; this is done in opposition to rotational torque returning the handle 45 to the retracted position, due to spring force of the clutch spring 92 and the urging mechanism 57. Rotational torque is normally energized in the return direction is for the following reasons.

(1) As the vehicle is driven the handle 45 is kept flat on the cover so as to not project significantly thereabove, making it more difficult for the handle 45 to be subjected to external force.
(2) Chattering of the handle 45 is reduced so that strange noises are not produced during driving.

The reason for using two resin springs as the urging mechanism 57 and the clutch spring 92 to produce rotational torque in the return direction is as follows.

Figure 37:
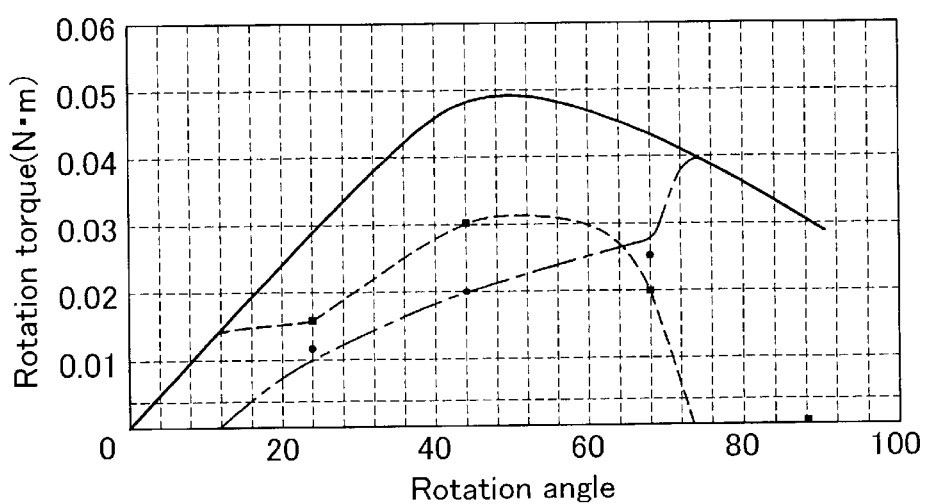
FIG. 37 is a graph illustrating the relationship of angle of rotation to rotational torque applied to handle.

FIG. 37 is a graph illustrating the relationship of angle of rotation to rotational torque applied to the handle. In FIG. 37, rotational torque produced by the urging mechanism 57 is graphed by a broken line, rotational torque produced by the clutch spring 92 by a dotted and dashed line, and total rotational torque applied to the handle 45 by a solid line. As will be apparent from FIG. 37, the urging mechanism 57 is set to high rotational torque at small angles of less than 45°, while the clutch spring 92 is set to high rotational torque at large angles of from 45° to 90°.

Rotational torque levels are set in this way for the following reason. The spring force produced by the urging mechanism 57 depends on the shape of the cam face 58a of the cam 58, making it difficult to produce a shape for a cam that can generate a high level of rotational torque over a wide control range. For the clutch spring 92 to generate rotational torque over a wide control range it would be necessary for the torque member 90 to move with a large stroke. Further, where only a single resin spring is used to generate rotational torque over a wide control range it will be necessary for the resin spring to flex appreciably, which over a period of several years may lead to failure. By using instead two resin springs, it is possible to achieve rotational torque for stable return over a wide range of 0–90°.

(5) Working Effects of the Fuel Cap 10

In addition to the working effects described above, the fuel cap 10 affords the following working effects.

(5)-1 In the process of closing the fuel cap 10, tactile warning is provided when the torque piece interlocking portions 96 of the torque member 90 ride up over body interlocking portions 25 of the casing body 20 as shown in FIGS. 25 and 26, so that the user may determine that the fuel cap 10 has been tightened to a predetermined level of torque, thereby allowing the cap to be attached to a predetermined level of torque regardless of any resilience on the part of the gasket GS etc.

(5)-2 With the fuel cap 10 closing the filler opening FNb as shown in FIG. 1, the clutch member 70 does not move in tandem with the casing body 20 in the opening direction, due to the clutch mechanism 60, and thus even if the handle 45 should be subjected to force in the opening direction due to some unforeseen external force, it will simply turn freely with respect to the casing body 20. Therefore the casing body 20 will not be subjected to external force applied to the handle 45 and will remain seated in the filler opening FNb. The fuel cap 10 can therefore maintain a seal without becoming loosened by unforeseen external force.

(5)-3 With the fuel cap 10 attached to filler opening FNb as shown in FIG. 1, the handle 45 is placed in the retracted position by spring force and returns to this position from the upraised handling position during the opening/closing operation, and is therefore not susceptible to external force such as that occurring in a vehicle collision or the like, so that it is not subjected to force tending to loosen the fuel cap 10. Additionally, even where the handle 45 is of appreciable size, since it is positioned laying flat on the upper wall 41 of the cover 40 in the closed position, a minimal amount of space around the filler opening is required to accommodate it.

(5)-4 As shown in FIG. 24, the body interlocking portions 25 of the torque transmission mechanism 80 are formed at equal distances all the way around the inner cover 30, whereby rotational torque may be transmitted immediately to the casing body 20 without changing the position of the handle 45, and whereby uniform rotational torque may be transmitted regardless of the position of the torque piece interlocking portions 96.

(5)-5 With the fuel cap 10 in the closed state, the handle 45 turns freely in the opening direction whereby the user may turn the handle 45 to the desired position, improving ease of opening/closing.

(5)-6 As shown in FIG. 1, with the fuel cap 10 in the closed state the handle 45 can be visually confirmed to be lowered into the retracted position, and it will be readily understood that opening/closing can be accomplished by upraising it, thereby providing superior operation to the button operation arrangement described in the prior art.

(5)-7 As shown in FIG. 18, the first clutch unit 63 transmits rotational torque even when the handle 45 is not in the handling position, so that even if the user neglects to move the handle 45 to the handling position it is still possible to close the tank opening with the casing body 20. The first clutch unit 63 (FIG. 18) and the second clutch unit 65 (FIG. 20) turn freely in the opening direction when the handle 45 is in the retracted position, so that the casing body 20 will not be rotated by external force and will not lose seal.

B. Second Embodiment (1) General Structure of the Fuel Cap 210

Figure 38:
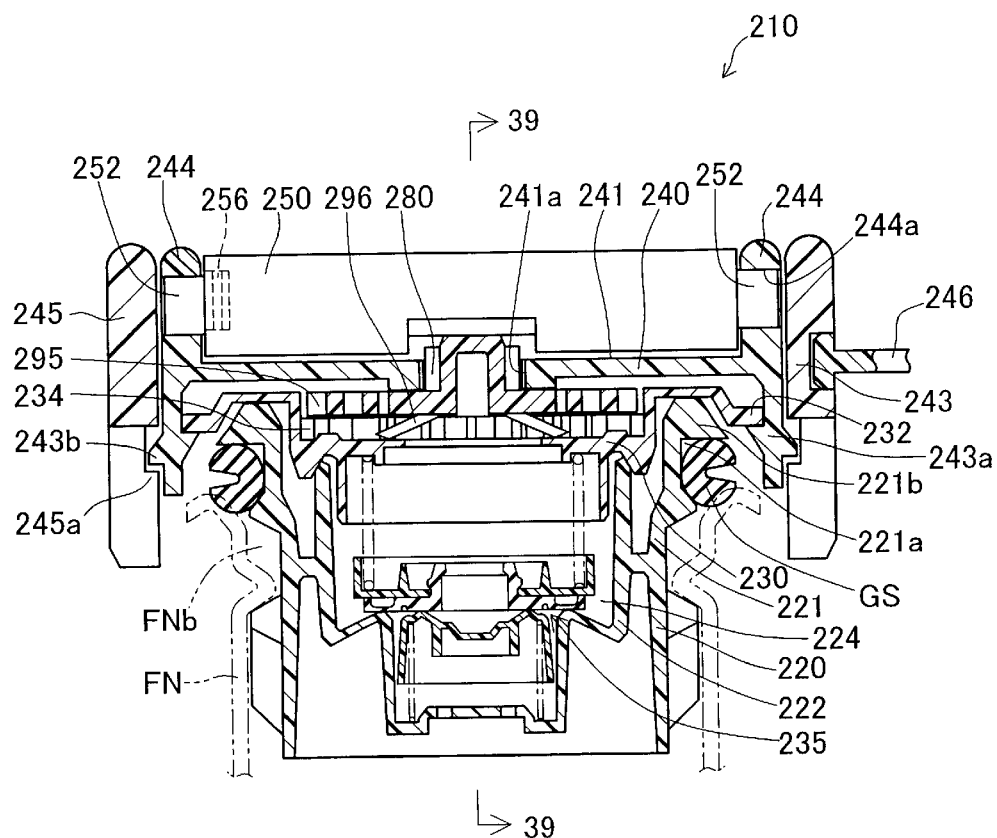
FIG. 38 is a sectional view showing a cap device comprising the fuel cap pertaining to a second embodiment of the present invention.
Figure 39:
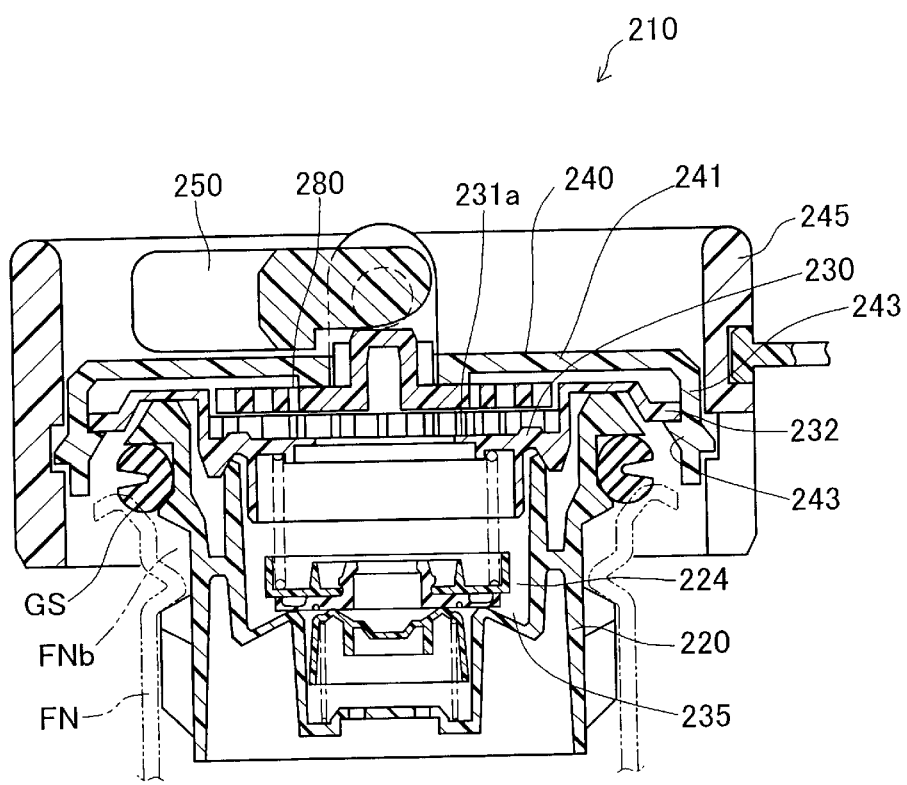
FIG. 39 is a sectional view taken along line 39—39 in FIG. 38.

FIGS. 38 and 39 are sectional views showing a cap device comprising the fuel cap 210 (cap) pertaining to a first embodiment of the invention, FIG. 38 being a sectional view showing the filler opening closed with the fuel cap 210 and FIG. 39 being a sectional view taken along line 39—39 in FIG. 38. In FIGS. 38 and 39 the fuel cap 210 is attached to a filler neck FN having a filler opening FNb (tank opening) for supplying fuel to a fuel tank, not shown in the drawing; and comprises the casing body 220 (casing main body) of polyacetal or other synthetic resin material, an inner cover 230 closing the upper opening of the casing body 220 to form a valve chamber 224; a regulator valve 235 housed within the valve chamber 224; a cover 240 of nylon or other synthetic resin material mounted on the upper portion of the casing body 220; a protector 245 attached to the outside wall of the cover 240; a handle 250 mounted on the upper face of the cover 240; a torque mechanism 280 (interconnecting mechanism); and a gasket GS for providing a seal between the casing body 220 and the filler neck FN.

In the above the fuel cap 210 arrangement, grasping the handle 250 and raising it upward while rotating allows the fuel cap 210 to be attached to or detached from the filler neck FN to close or open the filler opening FNb.

(2) Arrangement of Parts

The various parts of the fuel cap 210 pertaining to the present embodiment are described in detail hereinbelow.

(2)-1 Casing Body 220

The casing body 220 comprises a substantially round the outer tube 221 and a valve chamber molding 222 integrally provided to the interior of the outer tube 221. The valve chamber molding 222 houses a positive pressure valve and negative pressure valve that function as a regulator valve 235. Inner cover 230 is welded by an ultrasonic welding technique onto the upper portion of the valve chamber molding 222 to form the valve chamber 224.

A gasket GS is installed to the outside of the bottom edge of a flange 221b in the upper portion of the casing body 220. The gasket GS is interposed between the seal retaining portion 221a of the flange 221b and the filler opening FNb of filler neck FN so as to be forced against the seating face of the filler neck FN when the fuel cap 210 is tightened in filler opening FNb, providing a sealing action.

Figure 40:
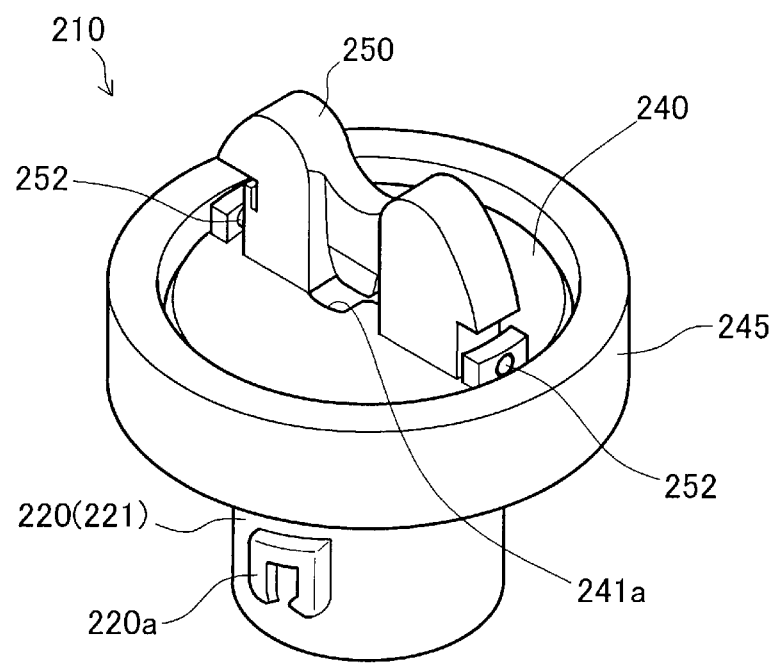
FIG. 40 is an illustrative diagram showing the relationship of the casing interlocking portion of the casing body to the filler neck.
Figure 40:
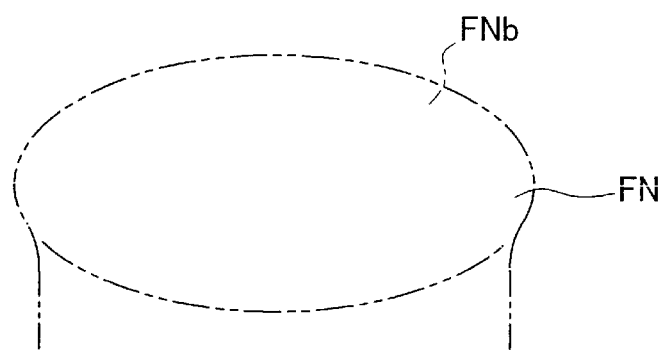
Figure 40:
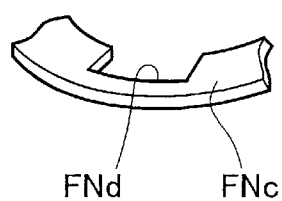

FIG. 40 is an illustrative diagram showing the relationship of the casing interlocking portion 220a of the casing body 220 to the filler neck FN. A casing interlocking portion 220a is formed on the bottom outside wall of the outer tube 221. A opening interlocking portion FNc is formed on the inside wall of the filler neck FN. In a portion of the inside wall of opening interlocking portion FNc is formed a the neck insertion notch FNd into which the casing interlocking portion 220a is insertable in the axial direction. With the casing interlocking portion 220a aligned with the neck insertion notch FNd and the fuel cap 210 inserted into filler opening FNb of the filler neck FN, turning the fuel cap 210 by a predetermined angle (about 90°) causes the casing interlocking portion 220a to be engaged by the opening insertion notch FNc to attach the fuel cap 210 to the filler neck FN.

As shown in FIG. 38, the inner cover 230 has a flange 232 formed on its outside wall. The flange 232 projects outwardly from a flange 221b on the outer tube 221, and has mounted thereon the cover 240 as described later.

(2)-2 Structure of the Cover 240

In FIG. 38, the cover 240 is rotatably and detachably installed on the flange 232 of the inner cover 230. The cover 240 comprises an upper wall 241 and a side wall 243 formed at the outside rim of the upper wall 241, integrally molded by injection using an electrically conductive resin. A support projection 243a projects into the interior of the side wall 243. The support projection 243a is arranged at eight equidistant locations (two locations are shown in FIG. 39) along the inside rim of the side wall 243. The support projection 243a mates with the flange 232 of the inner cover 230 to attach the cover 240 to the casing body 220 via the inner cover 230. The axial support portions 244, 244 for supporting the handle 250 project up from the outside rim of the upper wall 241, and in the center portion there is located a mating hole 241a through which the center of a torque plate 290 may be passed, and for providing a whirl stop.

(2)-3 Protector 245

Protector 245 is mounted on the outside rim of the cover 240 and is a cylindrical member for protecting the upper portion of the fuel cap 210 from outside force. At the bottom edge of the protector 245 are formed the interlocking claws 245a at eight locations around the circumference separated by slits. The interlocking claws 245a interlock with an annular claw 243b projecting from the side wall 243 of the cover 240 to attach the protector 245 to the cover 240. A tether 246 is rotatably attached to the protector 245. The other end of the tether 246 is fixed to the fuel cap cover (not shown) to prevent the fuel cap 210 from becoming lost when the fuel cap 210 is removed.

(2)-4 Structure of the Handle 250

Figure 41:
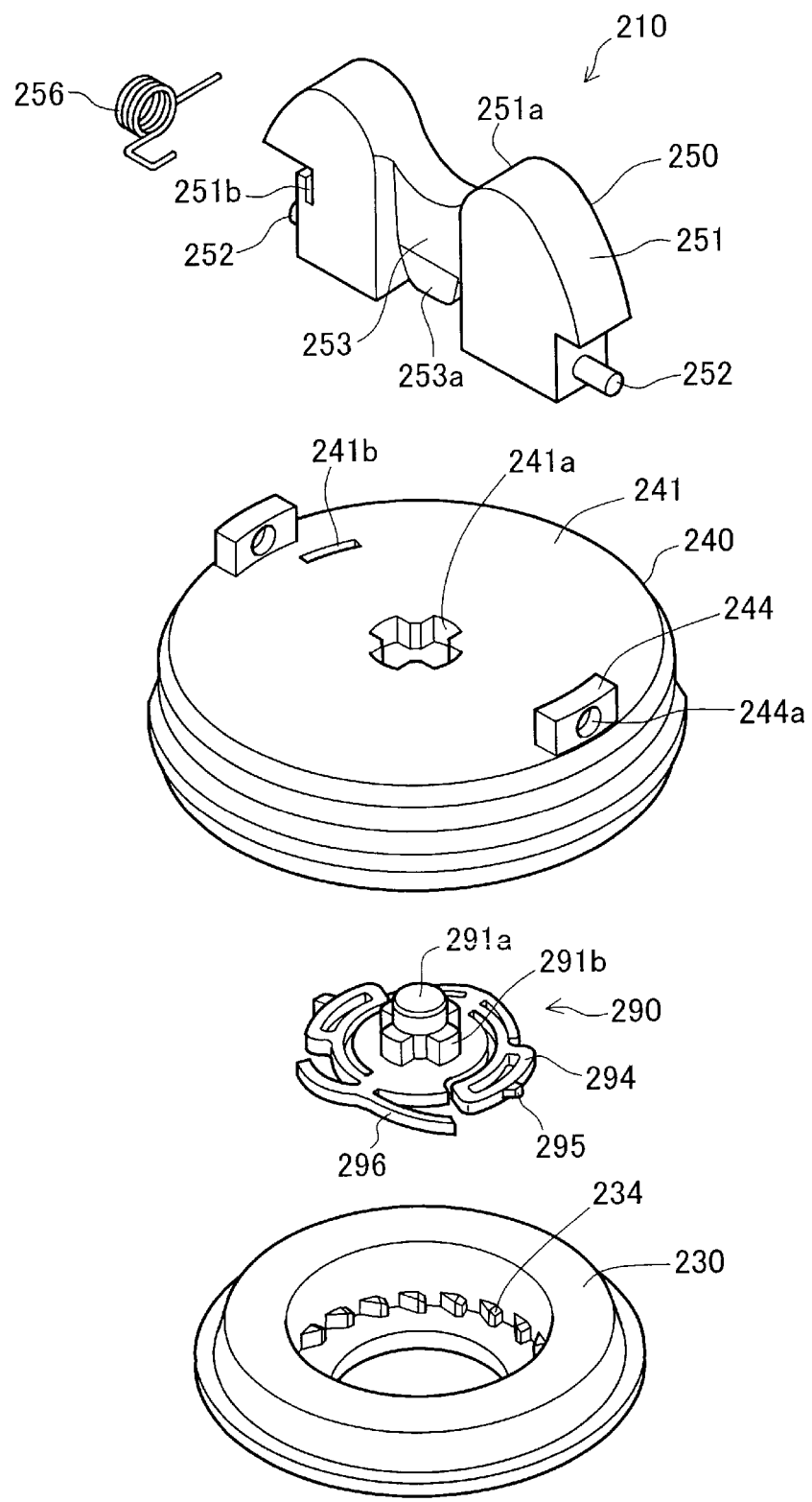
FIG. 41 is a perspective view showing parts on top of the cap disassembled.

FIG. 41 is a perspective view showing parts on top of the fuel cap 210 disassembled. The handle 250 comprises a handle body 251 and a spring 256. The handle body 251 is of semicircular configuration having an actuating recess 251a produced by recessing its outside edge at the center. The actuating recess 251a serves as a recessed location for inserting a finger to facilitate ease of operation of the handle 250. The support axles 252, 252 project to either side of the handle 250. The support axles 252, 252 are rotatably supported in the axle holes 224a in the axial support portions 244 of the cover 240.

The spring 256 is mounted on the exterior of a support axle 252. A first end of the spring 256 is detained by a detaining portion 251b of the handle 250, and a second end is detained by a detaining portion 241b of the cover 240. The handle 250 is mounted on the cover 240 in such a way that it can move between a retracted position wherein the handle body 251 is pressed against the upper wall 241 under the urging force of the spring 256, and a handling position wherein it is upraised in opposition to the force of the spring 256. With this arrangement, by inserting a finger into the actuating recess 251a and pulling the handle 250 up, the handle 250 swings about the support axles 252.

In the lower central portion of the handle body 251 there is formed a cam 253. The cam 253 comprises a cam face 253a for pushing the torque plate 290. The cam face 253a is designed to that when the handle 250 is in the handling position it pushes the torque plate 290, and when in the retracted position does not push the torque plate 290.

(2)-5 Structure of the Torque Mechanism 280

The torque mechanism 280 is a mechanism that enables confirmation that the fuel cap 210 has been attached to the filler neck FN at a predetermined level of rotational torque, by providing the user with a tactile warning if excessive rotational torque above a predetermined level is applied to the handle 250 during the operation of closing the filler opening FNb with the fuel cap 210.

Figure 42:
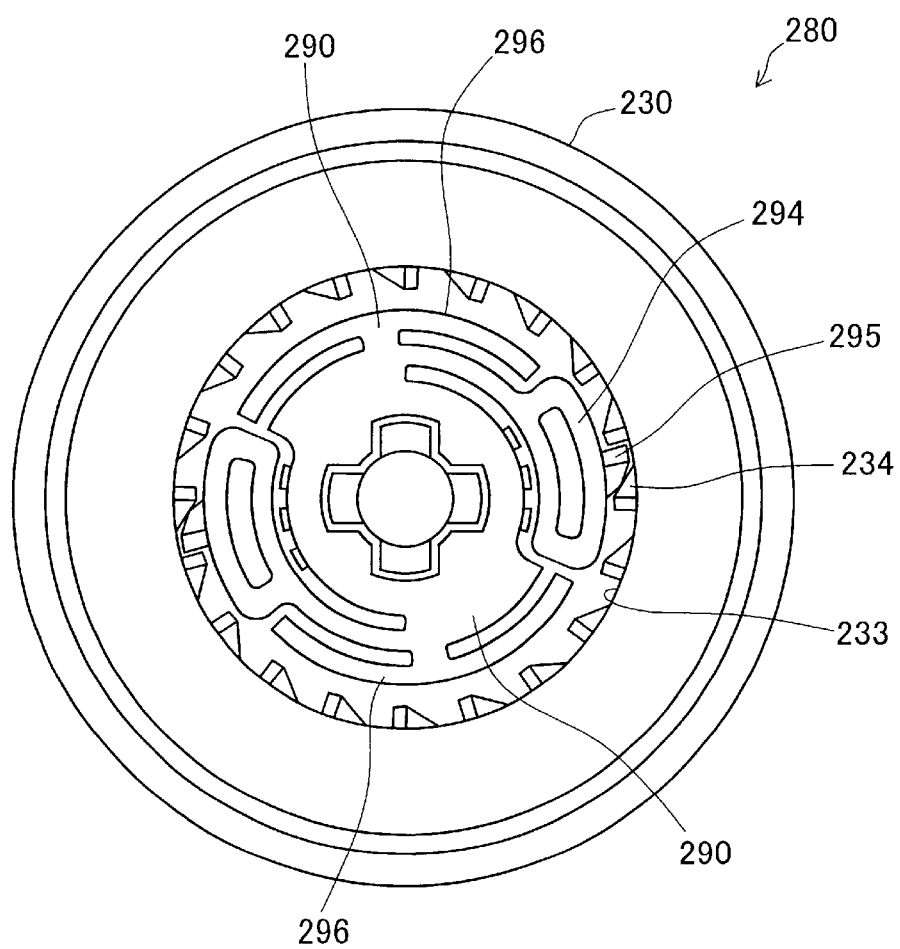
FIG. 42 is an illustrative diagram of the torque mechanism from above.
Figure 43:
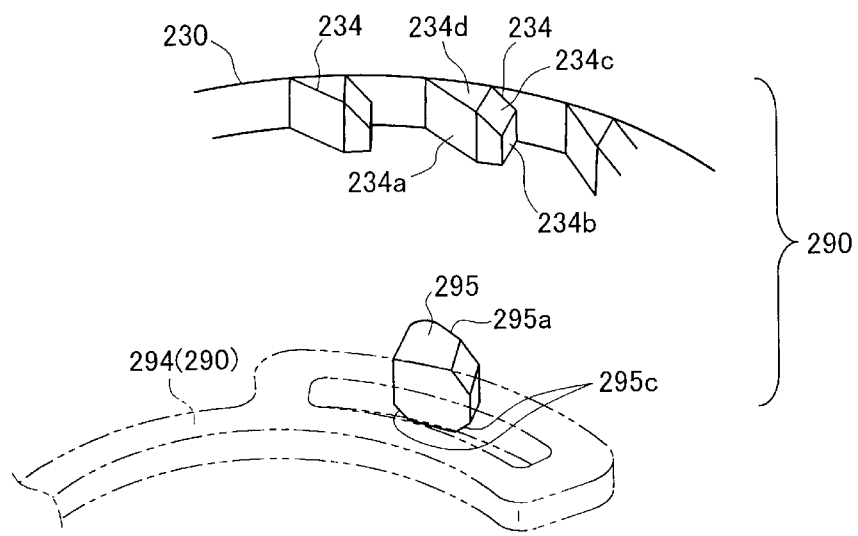
FIG. 43 is an illustrative diagram showing the relationship of the torque piece interlocking portion of the torque plate to the body interlocking portion.
Figure 44:
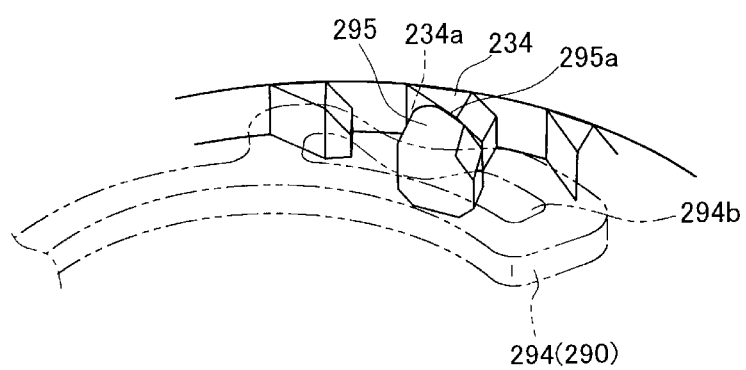
FIG. 44 is an illustrative diagram illustrating operation of the torque plate.
Figure 45:
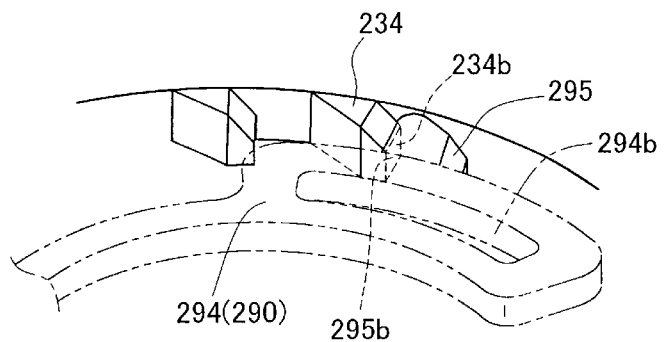
FIG. 45 is an illustrative diagram illustrating operation of the torque plate.

FIG. 42 is an illustrative diagram of the torque mechanism 280 from above, and FIGS. 43 to 45 are perspective views of principal components of the body interlocking portion 234 and the torque plate 290. Torque mechanism 280 comprises a body interlocking portion 234 formed on the inner cover 230, and the torque plate 290. In FIG. 42 the body interlocking portion 234 consists of projections for interlocking with the torque plate 290, these being of identical shape and arranged at equal intervals all the way around the circumference of the inner tube wall 233 of the inner cover 230; as shown in FIG. 43, these are each defined by a first interlocking face 234a, the second interlocking face 243b, the sloped guide face 234c, and the sloped guide face 234d. The first interlocking face 234a is a vertical face inclined somewhat and rising in the radial direction, while the second interlocking face 243b is a perpendicular face facing in the radial direction. The sloped guide faces 234c, 34d are faces with peaks in the center and sloped in the circumferential direction and downward.

Figure 46:
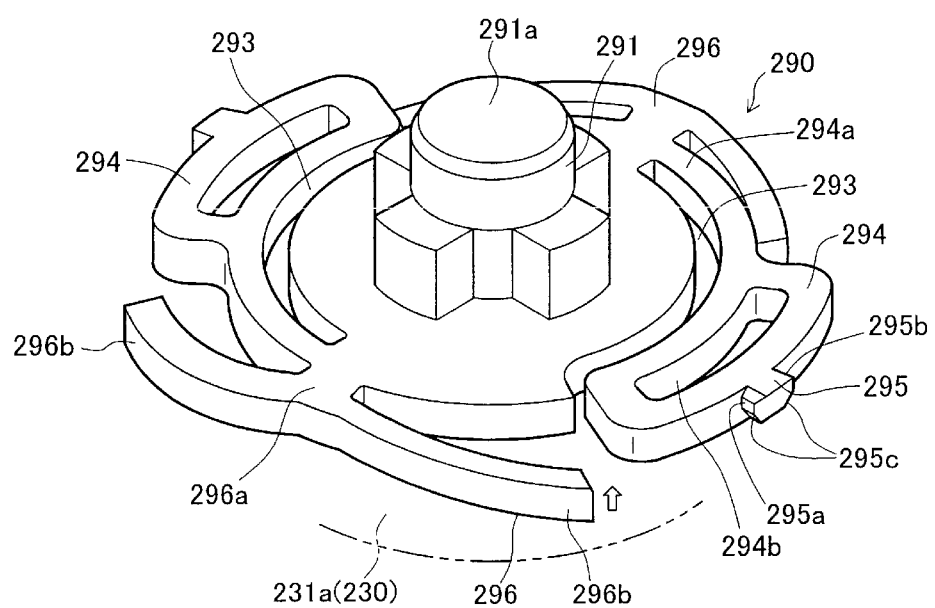
FIG. 46 is a perspective view showing the torque plate.

FIG. 46 is a perspective view showing the torque plate 290. In FIG. 46, the torque plate 290 consists of a thin disk of resin having a central projection and interlocking portions. That is, a central projection 291 of upward-facing cup configuration is formed in the center of the torque plate 290, and on the outside edge thereof are formed concentrically therewith the resilient torque pieces 294, 294 separated therefrom by grooves 293, 293. Additionally a spring piece 296 is formed on the outside edge.

The central projection 291 mates within the mating hole 241a of the cover 240 (see FIG. 41) so as to be extendable and retractable therethrough and provided with a whirl stop whereby the torque plate 290 and the cover 240 may rotate in unison. The upper face 291a of the central projection 291 is a pushing face 291*a* that pushes against the cam face 253*a* of the handle 250 (see FIG. 41).

Resilient torque pieces 294, 294 take the form of arched cantilever pieces having their support points at supporting terminal portions 294*a*, each having a torque piece interlocking portion 295 at the outside edge with a slot 294*b* located at the inside edge of the torque piece interlocking portion 295. The torque piece interlocking portion 295 has a first interlocking face 295*a* formed on a first face thereof, a second interlocking face 295*b* formed on a second face, and a sloped guide face 295*c* at the corner of the lower face. As shown in FIG. 43 the first interlocking face 295*a* is configured so as to come into abutment at a vertical face thereof with a first interlocking face 234*a* of the body interlocking portion 234 upon clockwise rotation of the torque plate 290; when pushed in the radial direction from the center by a body interlocking portion 234 the torque piece interlocking portion 295 undergoes resilient deformation so as to constrict the slot 294*b*, as shown in FIG. 44. As shown in FIG. 45 the second interlocking face 295*b* is configured so as to come into abutment at a sloped face thereof with a second interlocking face 234*b* of the body interlocking portion 234 upon counterclockwise rotation, whereby the torque plate 290 and the casing body 220 interlock so as to rotate in unison.

Returning to FIG. 46, spring pieces 296, 296 are formed on the outside edge of the torque plate 290. Each spring piece 296 comprises a basal portion 296*a* extending outwardly in the radial direction, and resilient pieces 296*b*, 296*b* extending in cantilever configuration from basal portion 296*a* to both sides in the circumferential direction; resilient pieces 296*b*, 296*b* are formed such that the distal ends thereof urge the torque plate 290 upwardly when pushed against the upper face 231*a* of the inner cover 230.

(3) Fuel Cap 210 Opening/Closing Operation

Following is a description of the opening and closing operation when attaching or replacing the fuel cap 210 in the filler opening FNb of the filler neck FN.

(3)-1 Fuel Cap 210 Closing Operation

Figure 47:
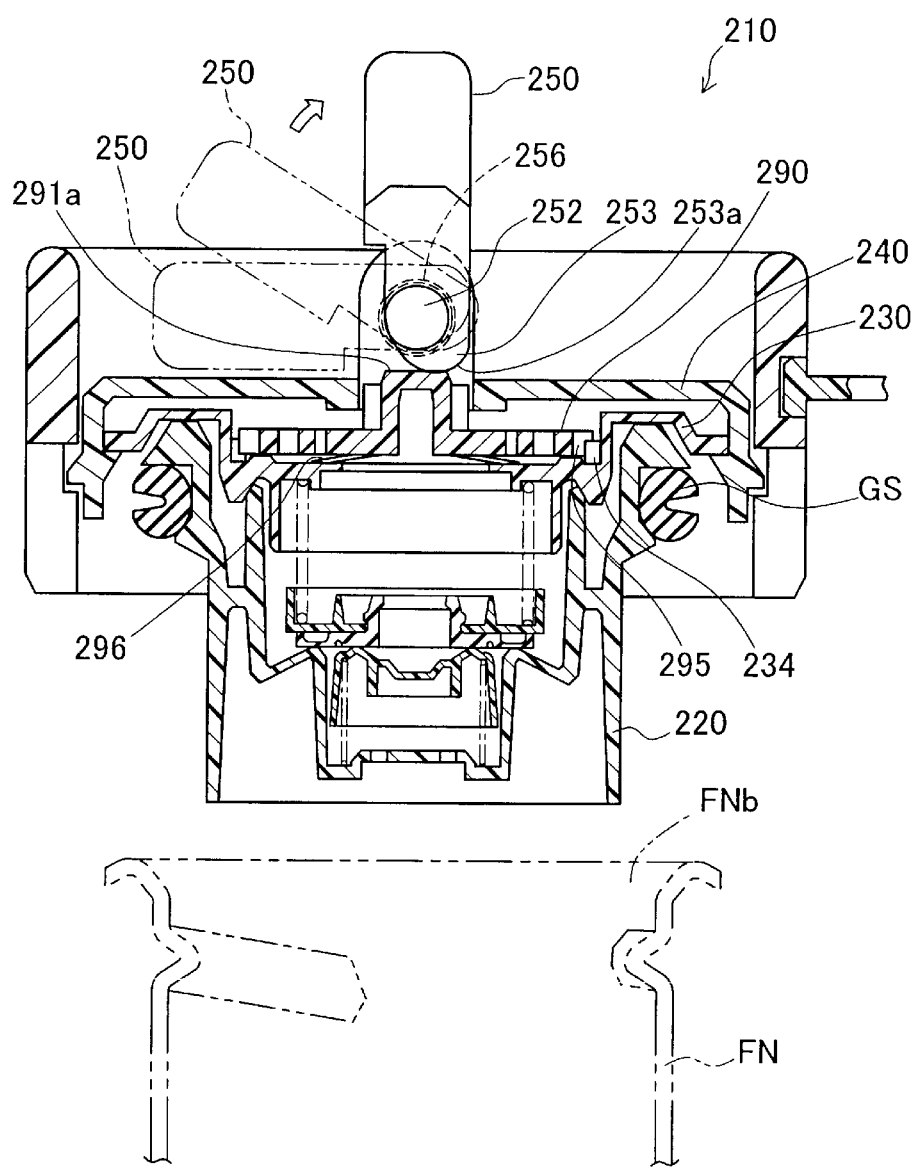
FIG. 47 is an illustrative diagram illustrating the operation of opening the fuel cap.
Figure 49:
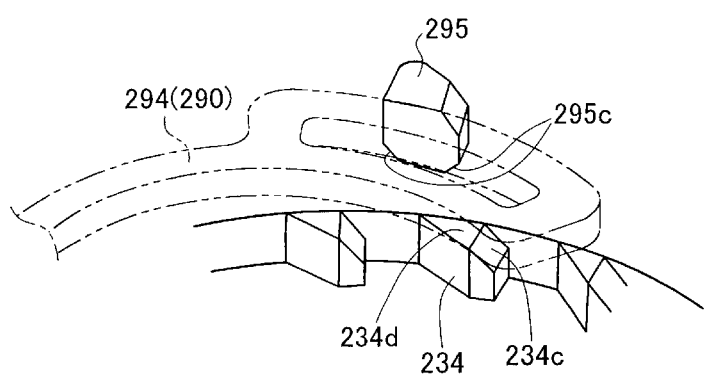
FIG. 49 is an illustrative diagram illustrating the operation of the torque plate moving to the mated state.

With filler opening FNb open as illustrated in FIG. 47, the handle 250 is pulled upright with the fingers as shown in FIG. 14, whereupon the handle 250 rotates about axial support portions 252, 252 in opposition to the spring force of the spring 256. This rotation of the handle 250 causes the cam face 253*a* to push against the pushing face 290 of the button 74 of the torque plate 290. Torque plate 290 is thus pushed downwardly in opposition to the spring force of spring piece 296, whereupon the torque piece interlocking portions 295 of the resilient torque pieces 294 are set in the interlock position for interlocking with the body interlocking portions 234. As shown in FIG. 49, even if a body interlocking portion 234 should be situated directly below a torque piece interlocking portion 295 the sloping guide face 295*c* will slide along the sloping guide faces 234*c*, 34*d* of the body interlocking portion 234 so that the torque plate moves smoothly to the interlock position.

Figure 48:
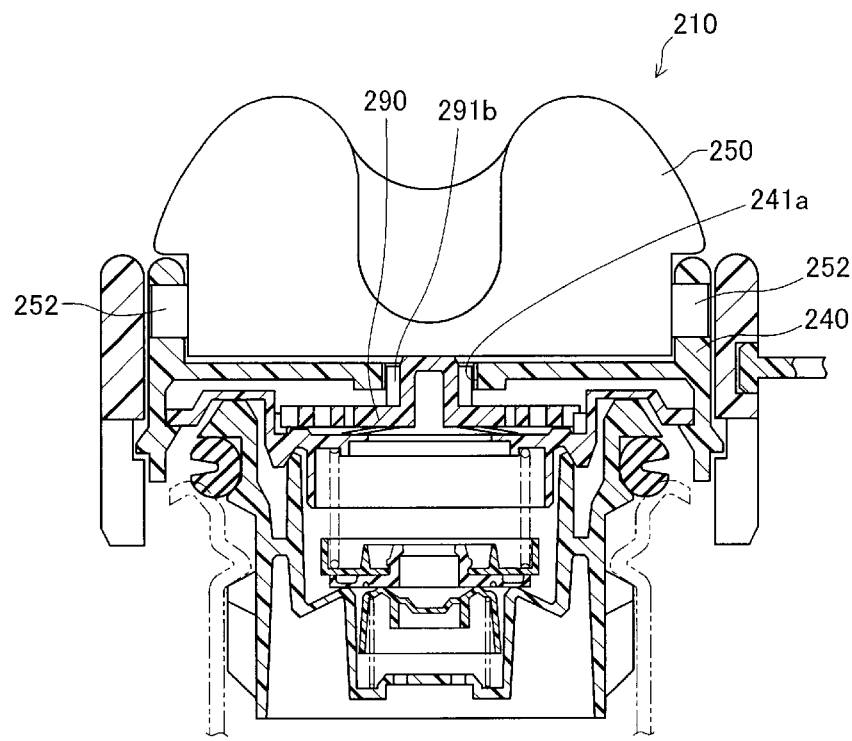
FIG. 48 is an illustrative diagram illustrating the operation of opening the fuel cap.

Next, as shown in FIG. 40, the casing interlocking portion 220*a* of the casing body 220 is aligned with the neck insertion notch FNd of the filler neck FN and inserted therein in the axial direction (state illustrated in FIG. 48). Clockwise force is then applied to the handle 250 to rotate the fuel cap 210. Rotational force applied to the handle 250 is transmitted to the torque plate 290 via the support axes 252, 252, the cover 240, the mating hole 241*a* of the cover 240, and the shaft the mating portion 291*b* of the torque plate 290 so that it rotates.

In association with this rotation of the torque plate 290, in the interlock position illustrated in FIG. 42, the torque piece interlocking portions 295 of the torque plate 290 push against the body interlocking portions 234 of the casing body 220. By means of the cover 240, the torque plate 290 and the casing body 220 rotate in unison in the direction of closing the filler opening FNb, with the casing interlocking portions 220*a* (see FIG. 40) interlocking with opening interlocking portion FNc with increasing force. When reaction force created by this interlocking force exceeds a predetermined level of rotational torque, torque piece interlocking portions 295 in the state shown in FIG. 50 now ride over the body interlocking portions 234, as shown in FIG. 51.

Figure 50:
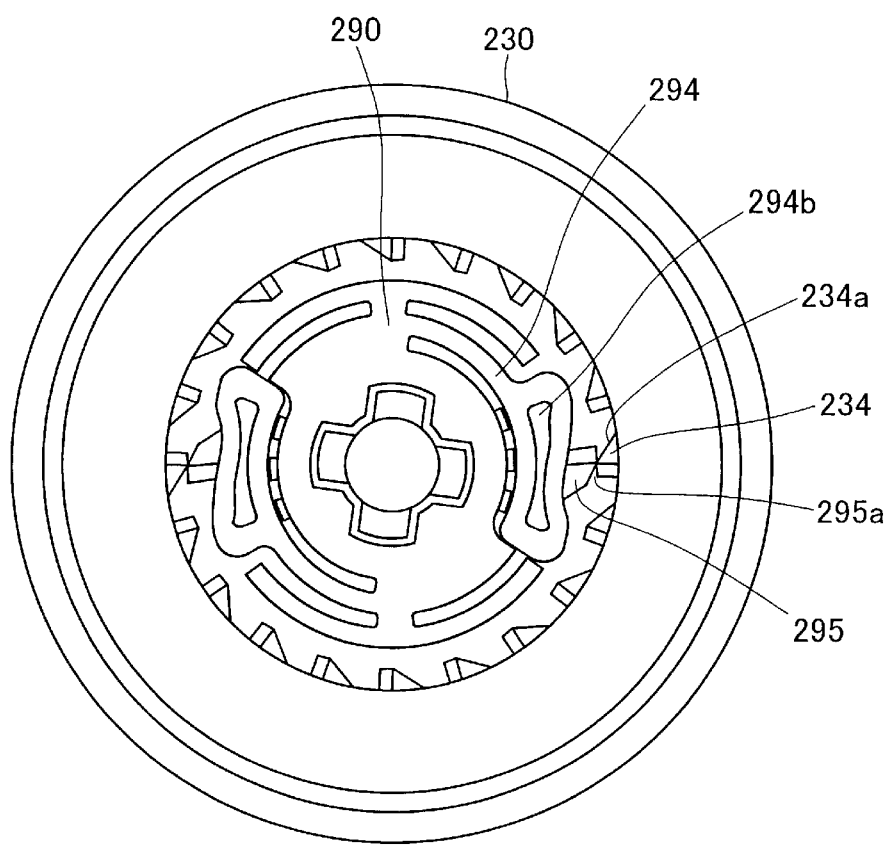
FIG. 50 is an illustrative diagram illustrating operation of torque mechanism in the closing direction.
Figure 51:
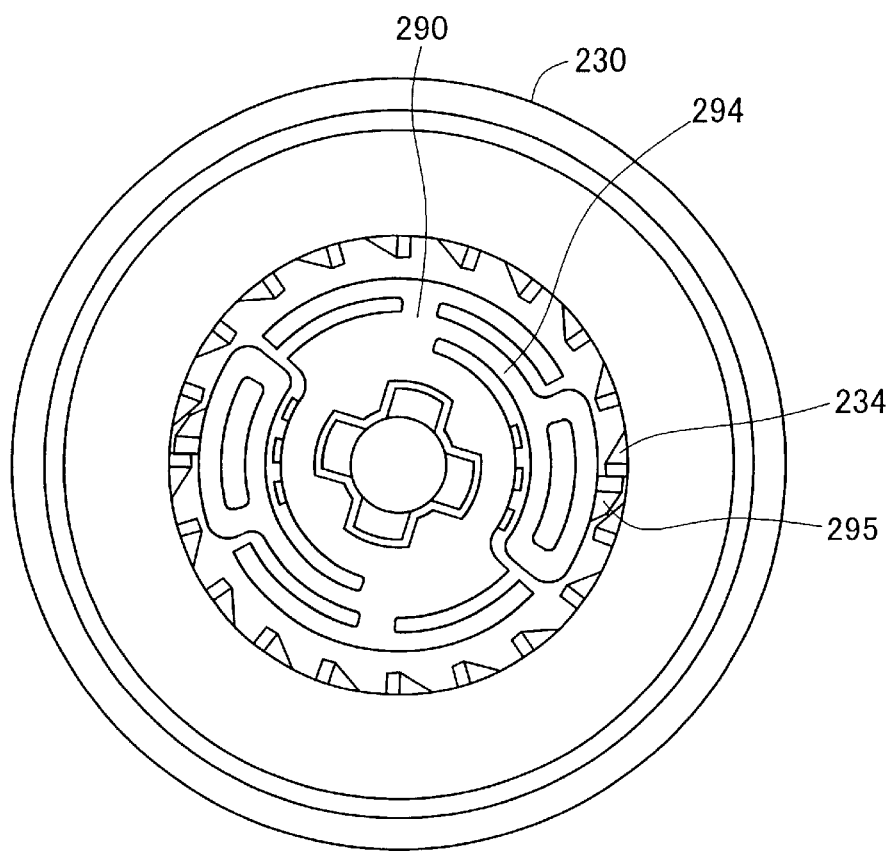
FIG. 51 is an illustrative diagram illustrating operation of torque mechanism in the opening direction.

At this point as shown in FIG. 50 the first interlocking faces 295*a* of torque piece interlocking portions 295 are forced in the radial direction by the reaction force from the first interlocking faces 234*a*, causing the resilient torque pieces 294 to resiliently deform so as to constrict the width of slots 294*b*, so that torque piece interlocking portions 295 ride up over the body interlocking portions 234. This provides to the user with a tactile warning of over-tightening. In this state the fuel cap 210 is attached to the filler opening FNb at a predetermined level of tightening torque.

When the handle 250 is subsequently released, as shown in FIG. 38 the handle 250 rotates about the support axes 252, 252 and returns back to the retracted position under the spring force of the spring 256. The torque plate 290, released from the restraining force of the handle 250, now moves upwardly under the spring force of spring piece 296. The torque piece interlocking portions 295 are thereby released from the interlock position with the body interlocking portions 234. In this state, the handle 250, the cover 240 and the torque plate 290 are not constrained by the casing body 220 and can turn freely.

That is, the torque plate 290 moves upwardly away from the body interlocking portions 234, in other words torque piece interlocking portions 295 move to a location disengaged from the body interlocking portions 234, thereby releasing the interconnection with the casing body 220. The cover 240 and the handle 250 are therefore able to rotate freely with respect to the casing body 220. Thus, in the event that the cover 240 or the handle 250 should be subjected to external force in the case of a collision or the like, these will turn freely without transmitting torque to the casing body 220 via the torque mechanism 280 so that the seal is not lost.

(3)-2 Fuel Cap 210 Opening Operation

To open the fuel cap 210, the handle 250 is grasped with the fingers. This causes the cam face 253*a* in the lower center of the handle 250 to push against the pushing face 291*a* of the torque plate 290, so that the torque plate 290 moves downwardly. In this state, turning the handle 250 counterclockwise causes the second interlocking faces 295*b* of torque piece interlocking portions 295 to interlock with the second interlocking faces 234*b* of the body interlocking portions 234 as shown in FIG. 45. The second interlocking faces 295*b* and the second interlocking faces 234*b* come into abutment substantially in the radial direction and do not produce center-directed force tending to constrict slots 294*b*, so that torque piece interlocking portions 295 do not ride over the body interlocking portions 234, but instead transmit rotational torque applied to the handle 250 to the casing body 220. As a result the handle 250, the cover 240, the torque plate 290 and the casing body 220 rotate in unison in the clockwise direction.

The casing interlocking portion 220*a* then comes away from the opening interlocking portion FNc of the filler neck FN so that the casing body 220 is released from the constraining force of the filler neck FN. The fuel cap 210 can now be removed from the filler neck FN by pulling out the cover 240 in the axial direction.

(4) Working Effects of the Fuel Cap 210

(4)-1 In the process of closing the fuel cap 210, tactile warning is provided when torque piece interlocking portions 295 of the torque plate 290 ride up over the body interlocking portions 234 of the casing body 220 as shown in FIGS. 50 and 51, so that the user may determine that the fuel cap 210 has been tightened to a predetermined level of torque, thereby allowing the cap to be attached to a predetermined level of torque regardless of any resilience on the part of the gasket GS etc.

(4)-2 With the fuel cap 210 closing the filler opening FNb as shown in FIG. 38, the torque plate 290 does not move in tandem with the casing body 220 in the opening direction, due to the urging force of the spring piece 296 of the torque plate 290, and thus even if the handle 250 should be subjected to force in the opening direction due to some unforeseen external force, it will simply turn freely with respect to the casing body 220. Therefore the casing body 220 will not be subjected to external force applied to the handle 250 and will remain seated in the filler opening FNb. The fuel cap 210 can therefore maintain a seal without becoming loosened by unforeseen external force.

(4)-3 With the fuel cap 210 attached to filler opening FNb as shown in FIG. 39, the handle 250 is placed in the retracted position by the force of the spring 256 and returns to this position from the upraised handling position during the opening/closing operation, and is therefore not susceptible to external force such as that occurring in a vehicle collision or the like, so that it is not subjected to force tending to loosen the fuel cap 210. Additionally, even where the handle 250 is of appreciable size, since it is positioned laying flat on the upper wall 241 of the cover 240 in the closed position, a minimal amount of space around the filler opening is required to accommodate it.

(4)-4 As shown in FIG. 42, the body interlocking portions 234 of the torque mechanism 280 are formed at equal distances all the way around the inner cover 230, whereby rotational torque may be transmitted immediately to the casing body 220 without changing the position of the handle 250, and whereby uniform rotational torque may be transmitted regardless of the position of torque piece interlocking portions 295.

(4)-5 With the fuel cap 210 in the closed state, the handle 250 turns freely in the opening direction whereby the user may turn the handle 250 to the desired position, improving ease of opening/closing.

(4)-6 As shown in FIG. 38, with the fuel cap 210 in the closed state the handle 250 can be visually confirmed to be lowered into the retracted position, and it will be readily understood that opening/closing can be accomplished by upraising it, thereby providing superior operation to the button operation arrangement described in the prior art.

(4)-7 As shown in FIG. 46, the torque plate 290 is supported by the distal ends of spring pieces 296 through line contact with the upper face 231a of the inner cover 230, and thus does not hinder rotation of the handle 250 and the cover 240 so that rotation is smooth.

Figure 52:
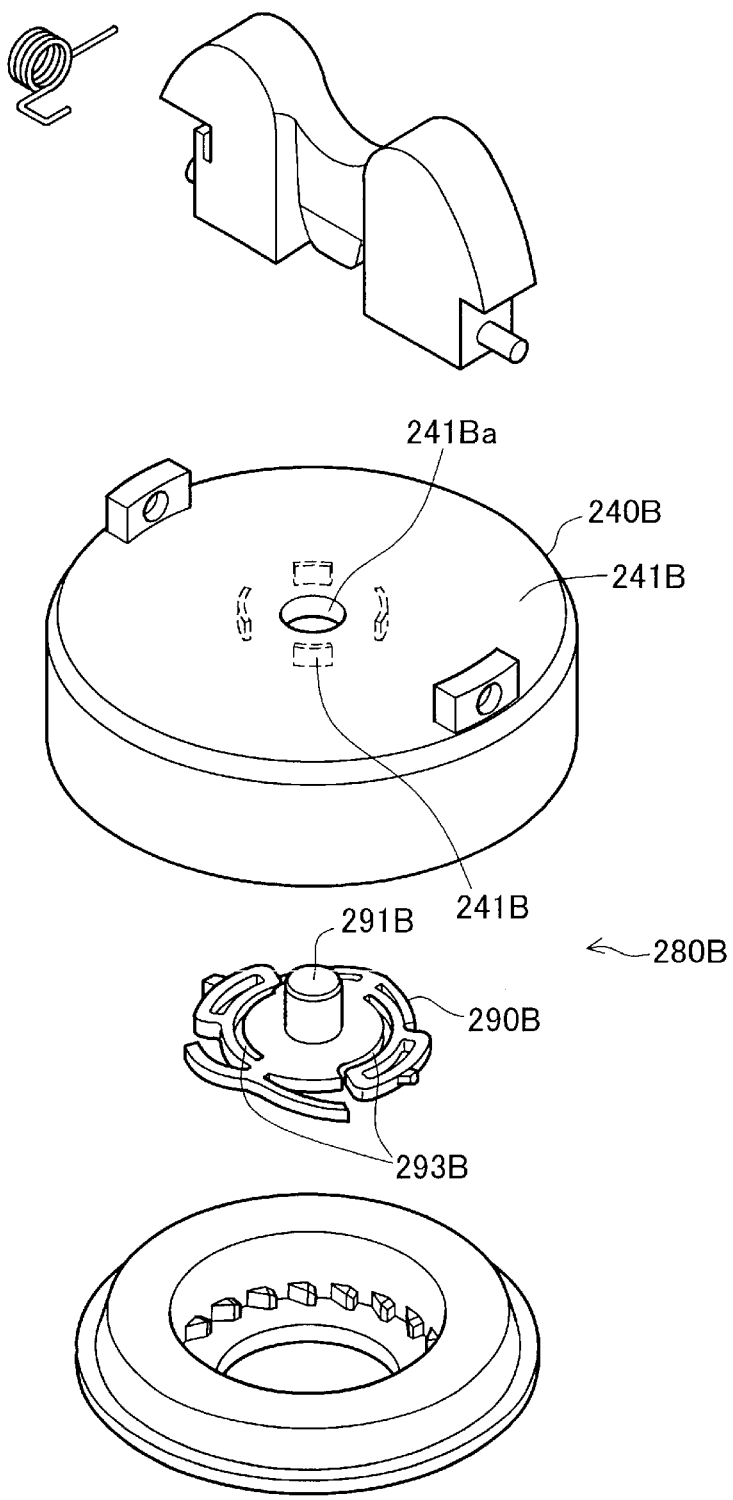
FIG. 52 is an exploded perspective view showing a modified example of the torque mechanism.

FIG. 52 is an exploded perspective view showing a modified example of the torque mechanism 280B. The center projection 291B of the torque plate 290B is cylindrical and passes through a through-hole 241B in the cover 240B. On the bottom face of the upper wall 241B of the cover 240B there are formed at four locations downwardly-facing detent pieces 241Bc. By inserting detent pieces 241Bc into a groove 293B in the torque plate 290B, the cover 240B and the torque plate 290B may be assembled together so as to rotate in unison. With this arrangement, since center projection 291B is a round post it is a simple matter to install a gasket around the outside wall of center projection 291B, this gasket serving to prevent rainwater from penetrating into the cover 240 through the through-hole 241B.

Figure 53:
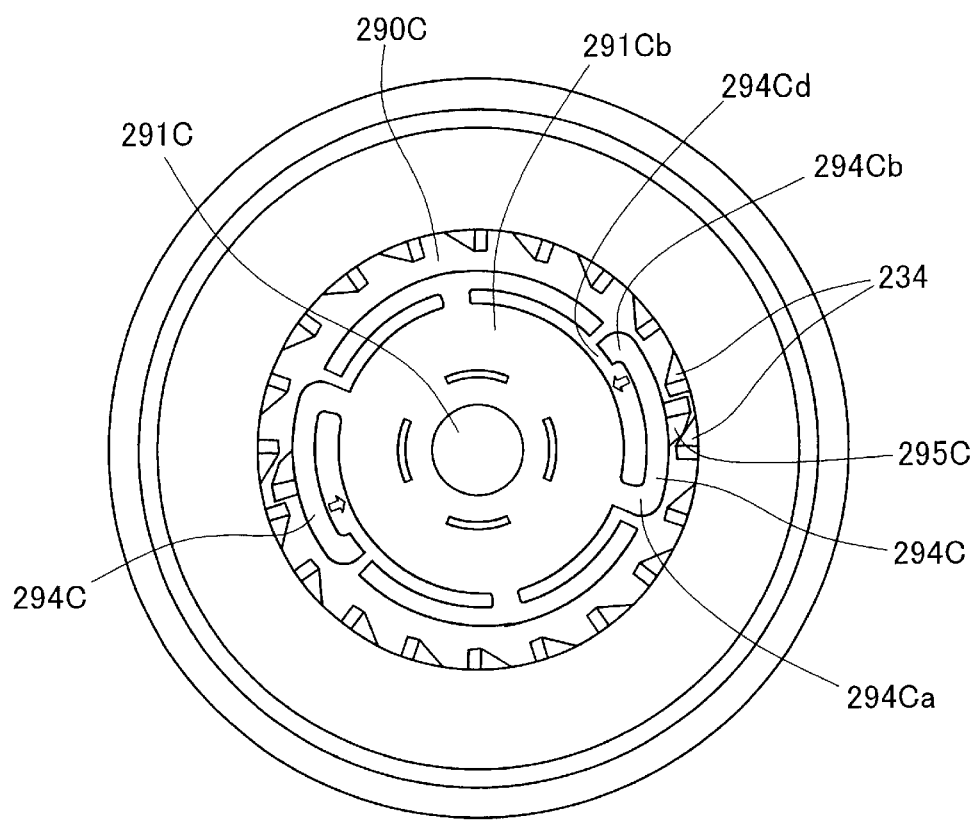
FIG. 53 is a plan view showing a modified example of the torque plate.

FIG. 53 is a plan view of a modified example of the torque plate 290C. The torque plate 290C is provided along the outside of its center projection 291C with a disk 291Cb, this disk 291Cb having the resilient torque pieces 294C, 294C formed at one end of its outside edge. Each resilient torque piece 294C, 294C comprises a torque piece interlocking portion 295C and is of arched cantilever configuration supported at a support end portion 294Ca, with the free end constituting a leg portion 294Cb. A gap 294Cd is present between leg portion 294Cb and disk 291Cb.

With this arrangement, as the torque plate 290C rotates in the clockwise direction, torque piece interlocking portions 295C are pushed by the body interlocking portions 234 causing the resilient torque pieces 294C, 294C to flex in a direction constricting the gaps 294Cd and ride up over the body interlocking portions 234. When the torque plate 290C is turned in the counterclockwise direction, they flex so as to expand gaps 294Cd, so that torque piece interlocking portions 295C interlock with the body interlocking portions 234 and rotate in unison.

The invention is not limited to the embodiments shown and described hereinabove, and various modifications and improvements thereof are possible without departing from the scope and spirit of the invention. The following modifications are possible, for example.

(1) In the preceding embodiment the clutch spring 92 for moving the clutch member 70 shown in FIG. 20 in the non-interconnected state is integrally formed with the torque member 90, but is not limited to this arrangement and could instead employ various other means such as a coil spring, either integrally formed or provided as a separate element, with the proviso that the arrangement must provide urging force between the torque member 90 and the casing body 20.

(2) In the preceding embodiment the spring for moving the torque plate 90 in the non-interconnected state is integrally formed with the torque plate 90, but is not limited to this arrangement and could instead employ various other means such as a coil spring, either integrally formed or provided as a separate element, with the proviso that the arrangement must provide urging force between the torque plate 90 and the casing body 20.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A cap device comprising a cap configured to open and close a tank opening, the cap comprising:

a closer for closing the tank opening with air-tight sealing at a closing position;

a handle mechanism having a handle, the handle being switchable between a handling position and a retracted position, the handling position being a position allowing a user to operate the handle to open and close the closer, the retracted position being a position in which the tank opening is closed, the handle in the handling position being configured to project outwardly from an upper portion of the closer a greater distance than the handle is in the retracted position; and an interconnecting mechanism, provided between the handle mechanism and the closer, for transmitting to the closer rotational torque in a closing direction and opening direction when the rotational torque is applied to the handle mechanism, wherein the interconnecting mechanism comprises a clutch mechanism, the clutch mechanism setting the interconnecting mechanism in a transmission mode and a non-transmission mode, the transmission mode being a mode wherein the rotational torque in the closing direction and the opening direction is transmitted from the handle to the closer when the handle is placed in the handling position, the non-transmission mode being mode wherein the rotational torque in the opening direction is prevented from transmitting from the handle to the closer and the handle mechanism rotates freely in the opening direction when the handle is placed in the retracted position.

2. The cap device according to claim 1, wherein the clutch mechanism is configured to set the interconnecting mechanism in the transmission mode in the closing direction when the handle is placed in the retracted position.

3. The cap device according to claim 2, wherein the clutch mechanism comprises a first clutch unit for transmitting the rotational torque to the closer to close the tank opening in both the handling position and the retracted position; and a second clutch unit for transmitting the rotational torque to the closer to open the tank opening when the handle is placed in the handling position.

4. The cap device according to claim 3, wherein the handle mechanism comprises a cover covering the interconnecting mechanism; and an axial support mechanism for pivotably supporting the handle, the support mechanism being configured to allow pivotal operation of the handle between the handling position and the retracted position relative to the cover.

5. The cap device according to claim 4, wherein the axial support mechanism comprises an urging mechanism for urging the handle towards the retracted position.

6. The cap device according to claim 5, wherein the urging mechanism comprises a cam having a cam face; and a resilient cam support piece for producing urging force towards the retracted position by pressing the cam face as the handle is rotated.

7. The cap device according to claim 6, wherein the urging mechanism is configured such that the urging force is greater at proximity to the retracted position than at handling position.

8. The cap device according to claim 7, wherein the clutch mechanism comprises a clutch member, a clutch urging mechanism including a cam face formed on the handle and a clutch spring that presses the clutch member, the clutch urging mechanism being configured such that when the handle is moved from the retracted position to the handling position, the clutch member is pushed via the cam face and switched to the transmission mode; and when the handle is moved from the handling position to the retracted position, the clutch member is switched to be urged by the clutch spring to the non-transmission mode.

9. The cap device according to claim 8, wherein the interconnecting mechanism comprises a torque transmission mechanism having a torque member for transmitting the rotational torque to the closer, the torque member being configured such that the rotational torque in the closing direction transmitted from the clutch mechanism is maintained less than a predetermined level.

10. The cap device according to claim 9, wherein the clutch spring is a resin spring integrally formed with the torque member.

11. The cap device according to claim 9, wherein the clutch spring comprises a resin spring integrally formed with the clutch member.

12. The cap device according to claim 11, wherein the clutch springs is configured to generate a pressing force greater at proximity to the handling position than at proximity to the retracted position.

13. The cap device according to claim 12, wherein the clutch spring is configured to press the torque member while the torque member is kept at a predetermined position relative to the closer.

14. The cap device according to claim 13, wherein the clutch spring comprises an arm formed as a cantilever piece having a first and second ends arranged coplanar with the torque member, the first end of the arm being supported on the torque member; and a pushing protrusion that extends from the second end of the arm, the clutch spring being configured to produce pressing force when the pushing protrusion is pressed by the clutch member.

15. The cap device according to claim 1, wherein the handle mechanism comprises a spring for pressing the handle to move to the retracted position when the handle is released from the handling position.

16. The cap device according to claim 1, wherein the closer comprises a casing body for sealing the tank opening, the casing body having a casing interlocking portion for interlocking with an opening interlocking portion formed on a filer neck via rotation of the casing body by a predetermined angle; and the handle mechanism having a cover, the cover rotatably mounted on the casing body and pivotally supporting the handle.

17. The cap device according to claim 16, wherein the interconnecting mechanism comprises (i) a torque plate with a torque plate interlocking portion; and a casing interlocking portion formed on an upper portion of the casing body and engaging and disengaging with the torque plate interlocking portion, and the handle comprises a cam, wherein the interconnecting mechanism is configured such that movement of the cam shifts the torque plate to change the interconnecting mechanism between the transmission mode and the non-transmission mode.

18. The cap device according to claim 17, further comprising a spring disposed between the torque plate and the casing body, the spring being configured to press the torque plate and the casing body towards the non-transmission mode.

19. The cap device according to claim 18, wherein the spring comprises a cantilever piece extending integrally from the torque plate, the cantilever piece having an end for pressing the casing body.

20. The cap device according to claim 19, wherein the spring comprises a cantilever piece extending integrally from an upper portion of the casing body, the cantilever piece having an end for pressing the torque plate.

* * * * *